US012027011B2

(12) United States Patent
Witt et al.

(10) Patent No.: US 12,027,011 B2
(45) Date of Patent: *Jul. 2, 2024

(54) SYSTEMS AND METHODS FOR ENHANCED GAMING SERVERS

(71) Applicant: Incredible Technologies, Inc., Vernon Hills, IL (US)

(72) Inventors: Christopher Russell Witt, Las Vegas, NV (US); Cory Allan Pratt, Palatine, IL (US); Anthony Peter DeFeo, Streamwood, IL (US); David James Kamner, Lake in the Hills, IL (US)

(73) Assignee: Incredible Technologies, Inc., Vernon Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,748

(22) Filed: Apr. 19, 2023

(65) Prior Publication Data

US 2024/0119788 A1 Apr. 11, 2024

Related U.S. Application Data

(63) Continuation of application No. 17/962,190, filed on Oct. 7, 2022, now Pat. No. 11,663,882.

(51) Int. Cl.
*G07F 17/32* (2006.01)

(52) U.S. Cl.
CPC ...... *G07F 17/3227* (2013.01); *G07F 17/3262* (2013.01); *G07F 17/329* (2013.01)

(58) Field of Classification Search
CPC .......... A63F 3/06; A63F 3/0605; A63F 3/062; A63F 3/0645; A63F 5/00; A63F 5/0005;
(Continued)

(56) References Cited

U.S. PATENT DOCUMENTS 3,853,324 A 12/1974 Reiner et al.
5,639,089 A 6/1997 Matsumoto et al.
(Continued)

OTHER PUBLICATIONS

"Everything You Need to Know About Bingo Roulette," Retrieved from the Internet on Oct. 6, 2022: https://howaboutbingo.com/games/bingo-roulette, pp. 1-5.
(Continued)

*Primary Examiner* — Milap Shah
(74) *Attorney, Agent, or Firm* — Resolute Legal PLLC

(57) ABSTRACT

Implementations of the present disclosure may include systems and methods for providing an improved bingo game based on player defined custom bingo cards and mapping the player defined custom bingo cards to simulate other games, such as, but not limited to, wheel based games such as roulette, dice games, and other suitable games. Implementations of the system and method may include receiving messages comprising one or more player wager selections from the plurality of electronic player interfaces, wherein the one or more player wager selections comprise one or more player selected game patterns. Implementations of the system and method may include creating one or more custom bingo cards based on the one or more player selected game patterns received in the one or more player wager selections.

20 Claims, 16 Drawing Sheets

(58) Field of Classification Search
CPC .... A63F 5/02; G07F 17/3225; G07F 17/3227; G07F 17/3258; G07F 17/3262; G07F 17/3267; G07F 17/329
See application file for complete search history.

(56) References Cited

U.S. PATENT DOCUMENTS

| | | | | | |
|---|---|---|---|---|---|
| 8,128,475 | B2 | 3/2012 | Goss | | |
| 8,241,103 | B2 * | 8/2012 | Yarbrough | G07F 17/32 | 463/19 |
| 8,262,451 | B2 | 9/2012 | Powell et al. | | |
| 8,342,941 | B2 | 1/2013 | Nicely | | |
| 8,562,412 | B2 | 10/2013 | Matsuno | | |
| 8,757,622 | B1 | 6/2014 | King | | |
| 9,821,218 | B2 | 11/2017 | Elias et al. | | |
| 9,984,536 | B2 | 5/2018 | Weingardt et al. | | |
| 10,360,765 | B2 * | 7/2019 | Berman | G07F 17/329 | |
| 10,846,992 | B2 | 11/2020 | Demasters et al. | | |
| 10,896,581 | B2 * | 1/2021 | Luciano | G07F 17/329 | |
| 11,663,882 | B1 * | 5/2023 | Witt | G07F 17/3293 | 463/19 |
| 2002/0177478 | A1 * | 11/2002 | Glasson | G07F 17/32 | 463/19 |
| 2004/0009806 | A1 * | 1/2004 | Odom | A63F 3/062 | 463/19 |
| 2004/0235555 | A1 * | 11/2004 | Yarbrough | G07F 17/32 | 463/19 |
| 2008/0139275 | A1 | 6/2008 | Goss | | |
| 2008/0139281 | A1 | 6/2008 | Yoshizawa | | |
| 2009/0061981 | A1 | 3/2009 | Smith | | |
| 2011/0009179 | A1 * | 1/2011 | Tomei | G07F 17/329 | 463/19 |
| 2014/0197598 | A1 | 7/2014 | King | | |
| 2014/0221072 | A1 | 8/2014 | Pockaj | | |
| 2014/0357338 | A1 | 12/2014 | Pockaj | | |
| 2015/0248807 | A1 | 9/2015 | Berman | | |
| 2017/0326442 | A1 | 11/2017 | Leake | | |
| 2023/0115157 | A1 * | 4/2023 | Williams | G07F 17/3262 | 463/17 |

OTHER PUBLICATIONS

"Everything You Need to Know About Bingo Roulette (Dragonfish)," Retrieved from the Internet on Oct. 6, 2022: https://howaboutbingo.com/games/bingo-roulette-df, pp. 1-6.

"Bingo Roulette," Retrieved from the Internet on Oct. 6, 2022: https://www.blightybingo.com/games/bingo-roulette/, pp. 1-2.

* cited by examiner

SYSTEMS AND METHODS FOR ENHANCED GAMING SERVERS

CROSS REFERENCE TO RELATED APPLICATION

This application is a continuation of U.S. application Ser. No. 17/962,190, filed Oct. 7, 2022, the contents of which are hereby incorporated by reference.

FIELD OF THE DISCLOSURE

Implementations of the disclosure relate to systems, servers, methods, and devices for computing, providing enhanced functionality and technical improvements over exiting computing systems. More specifically, implementations of the disclosure relate to systems, servers, methods and devices for improving the technology of electronic gaming.

BACKGROUND

Bingo games are widely played. In the United States, bingo games can be classified as class II gaming under the Indian Gaming Regulatory Act (IGRA). Traditional casino games such as slot machine games, table games, etc. are classified as class III gaming. While games classified under class III gaming can be regulated by individual states, IGRA permits certain Indian tribes to operate class II games such as bingo without subjecting the Indian tribes to individual state gaming laws. Thus, there is a need for new and improved bingo games to keep players entertained.

BRIEF SUMMARY

In some aspects, the techniques described herein relate to a gaming server, including: at least one processor; and at least one memory that stores computer executable instructions, wherein, when the computer executable instructions are executed by the at least one processor, the at least one processor is configured to: receive a request from a center device to verify at least one active bingo game session; adding the center device to the at least one active bingo game session; transmit, to the center device, a response verifying the at least one active bingo game session and that the center device was associated with the at least one active bingo game session; receive, from the center device, a message including an interim winning game pattern, wherein the interim winning game pattern includes at least one random number selection; receive messages including one or more player wager selections from a plurality of electronic player interfaces, wherein the one or more player wager selections include one or more player selected game patterns; create one or more custom bingo cards based on the one or more player selected game patterns received in the one or more player wager selections; evaluate the one or more custom bingo cards for a pattern matching the interim winning game pattern; mark a spot on the one or more custom bingo cards based on the one or more player selected game patterns matching the at least one random number selection of the interim winning game pattern; evaluate the one or more custom bingo cards against predetermined patterns for matching patterns based on the marked spots of the one or more custom bingo cards to determine winning player wager selections; and transmit, to the plurality of electronic player interfaces, messages including the one or more custom bingo cards and the winning player wager selections.

In some aspects, the techniques described herein relate to a gaming server, wherein one player wager selection of the one or more player wager selections is used to create one custom bingo card.

In some aspects, the techniques described herein relate to a gaming server, wherein a plurality of player wager selections of the one or more player wager selections is used to create one custom bingo card.

In some aspects, the techniques described herein relate to a gaming server, wherein different player wager selections of the one or more player wager selections are used to create different custom bingo cards.

In some aspects, the techniques described herein relate to a gaming server, wherein creating the one or more custom bingo cards further includes adding the one or more player selected game patterns to spots on the one or more custom bingo cards and filling in any unfilled spots on the one or more custom bingo cards with randomly generated numbers.

In some aspects, the techniques described herein relate to a gaming server, wherein adding the one or more player selected game patterns to spots on the one or more bingo cards further includes adding the one or more player selected game patterns to predefined spots on the one or more custom bingo cards.

In some aspects, the techniques described herein relate to a gaming server, wherein the predefined spots on the one or more custom bingo cards are selected based on a type of wager.

In some aspects, the techniques described herein relate to a gaming server, wherein evaluating the one or more custom bingo cards for matching patterns further includes: evaluating the one or more custom bingo cards against predetermined patterns that are determined based on classifications of individual player wager selections.

In some aspects, the techniques described herein relate to a gaming server, wherein the interim winning game pattern is generated by a hardware based random number generator.

In some aspects, the techniques described herein relate to a gaming server, wherein the hardware based random number generator includes is a physical roulette wheel and a ball.

In some aspects, the techniques described herein relate to a gaming server, wherein the interim winning game pattern is generated by a software based random number generator.

In some aspects, the techniques described herein relate to a gaming server, wherein receiving the messages including the one or more player wager selections from one or more electronic player interfaces occurs after receiving the message including the interim winning game pattern.

In some aspects, the techniques described herein relate to a gaming server, wherein the one or more player wager selections are withheld at the one or more electronic player interfaces until the interim winning game pattern has been received.

In some aspects, the techniques described herein relate to a gaming server, wherein the winning player wager selections in the at least one active bingo game session are determined with one random number selection.

In some aspects, the techniques described herein relate to a gaming server, wherein the one or more player selected game patterns are for a bingo game that is mapped to a technological aid formed as a roulette style player interface.

In some aspects, the techniques described herein relate to a gaming server, wherein the one or more player selected game patterns are for a bingo game that is mapped to a technological aid formed as a craps style player interface.

In some aspects, the techniques described herein relate to a gaming server, wherein receiving the request from the plurality of electronic player interfaces further includes receiving the requests from the plurality of electronic player interfaces associated with different game centers.

In some aspects, the techniques described herein relate to a gaming server, wherein the different game centers are separate roulette wheel based bingo games that can be assigned to different active bingo game sessions.

In some aspects, the techniques described herein relate to a gaming server, wherein creating the one or more custom bingo cards further includes creating a plurality of custom bingo cards for a plurality of different players at electronic player interfaces associated with different game centers.

In some aspects, the techniques described herein relate to a gaming server, wherein at least one of the predefined spots on the one or more custom bingo cards overlap between different types of wagers.

In some aspects, the techniques described herein relate to a method of operating a gaming server, including: receiving a request from a center device to verify at least one active bingo game session; adding the center device the at least one active bingo game session; transmitting, to the center device, a response verifying the at least one active bingo game session and that the center device was associated with the at least one active bingo game session; receiving, from the center device, a message including an interim winning game pattern, wherein the interim winning game pattern includes at least one random number selection; receiving messages including one or more player wager selections from a plurality of electronic player interfaces, wherein the one or more player wager selections include one or more player selected game patterns; creating one or more custom bingo cards based on the one or more player selected game patterns received in the one or more player wager selections; evaluating the one or more custom bingo cards for a pattern matching the interim winning game pattern; marking a spot on the one or more custom bingo cards based on the one or more player selected game patterns matching the at least one random number selection of the interim winning game pattern; evaluating the one or more custom bingo cards against predetermined patterns for matching patterns based on the marked spots of the one or more custom bingo cards to determine winning player wager selections; and transmitting, to the plurality of electronic player interfaces, messages including the one or more custom bingo cards and the winning player wager selections.

In some aspects, the techniques described herein relate to the method, wherein one player wager selection of the one or more player wager selections is used to create one custom bingo card.

In some aspects, the techniques described herein relate to the method, wherein a plurality of player wager selections of the one or more player wager selections is used to create one custom bingo card.

In some aspects, the techniques described herein relate to the method, wherein different player wager selections of the one or more player wager selections are used to create different custom bingo cards.

In some aspects, the techniques described herein relate to the method, wherein creating the one or more custom bingo cards further includes adding the one or more player selected game patterns to spots on the one or more custom bingo cards and filling in any unfilled spots on the one or more custom bingo cards with randomly generated numbers.

In some aspects, the techniques described herein relate to the method, wherein adding the one or more player selected game patterns to spots on the one or more bingo cards further includes adding the one or more player selected game patterns to predefined spots on the one or more custom bingo cards.

In some aspects, the techniques described herein relate to the method, wherein the predefined spots on the one or more custom bingo cards are selected based on a type of wager.

In some aspects, the techniques described herein relate to the method, wherein evaluating the one or more custom bingo cards for matching patterns further includes: evaluating the one or more custom bingo cards against predetermined patterns that are determined based on classifications of individual player wager selections.

In some aspects, the techniques described herein relate to the method, wherein the interim winning game pattern is generated by a hardware based random number generator.

In some aspects, the techniques described herein relate to the method, wherein the hardware based random number generator includes is a physical roulette wheel and a ball.

In some aspects, the techniques described herein relate to the method, wherein the interim winning game pattern is generated by a software based random number generator.

In some aspects, the techniques described herein relate to the method, wherein receiving the messages including the one or more player wager selections from one or more electronic player interfaces occurs after receiving the message including the interim winning game pattern.

In some aspects, the techniques described herein relate to the method, wherein the one or more player wager selections are withheld at the one or more electronic player interfaces until the interim winning game pattern has been received.

In some aspects, the techniques described herein relate to the method, wherein the winning player wager selections in the at least one active bingo game session are determined with one random number selection.

In some aspects, the techniques described herein relate to the method, wherein the one or more player selected game patterns are for a bingo game that is mapped to a technological aid formed as a roulette style player interface.

In some aspects, the techniques described herein relate to the method, wherein the one or more player selected game patterns are for a bingo game that is mapped to a technological aid formed as a craps style player interface.

In some aspects, the techniques described herein relate to the method, wherein receiving the request from the plurality of electronic player interfaces further includes receiving the requests from the plurality of electronic player interfaces associated with different game centers.

In some aspects, the techniques described herein relate to the method, wherein the different game centers are separate roulette wheel based bingo games that can be assigned to different active bingo game sessions.

In some aspects, the techniques described herein relate to the method, wherein creating the one or more custom bingo cards further includes creating a plurality of custom bingo cards for a plurality of different players at electronic player interfaces associated with different game centers.

In some aspects, the techniques described herein relate to the method, wherein at least one of the predefined spots on the one or more custom bingo cards overlap between different types of wagers.

DETAILED DESCRIPTION

Figure 1A:
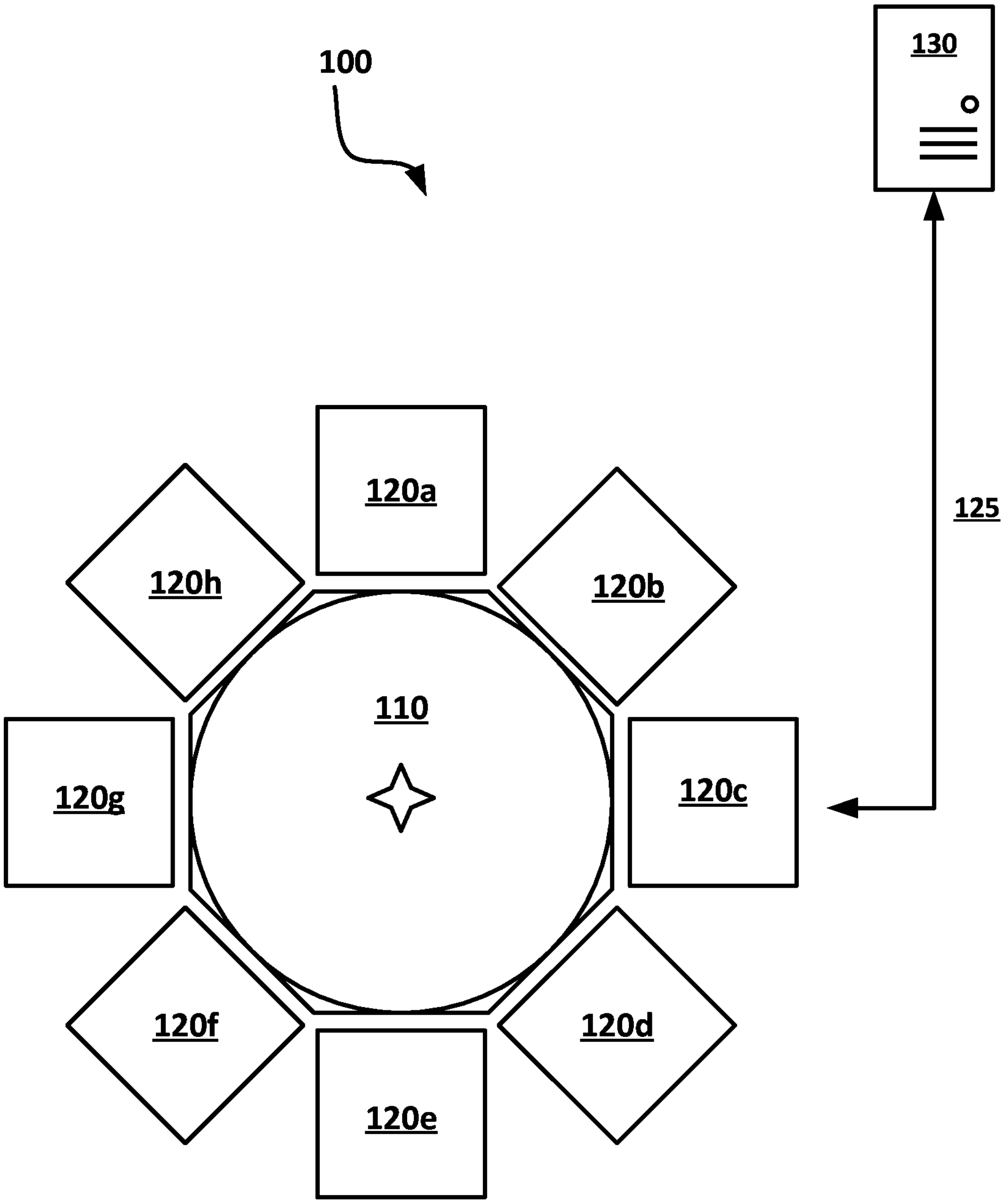
FIG. 1A illustrates a system, according to some implementations of the present disclosure.

FIG. 1A illustrates a system, according to some implementations of the present disclosure. In some implementations, a bingo system 100 may include a center device 110, a plurality of electronic player interface devices (referred to herein as EPI or EPIs) such as EPI 120*a*, EPI 120*b*, EPI 120*c*, EPI 120*d*, EPI 120*e*, EPI 120*f*, EPI 120*g*, EPI 120*h*. The bingo system 100 include a bingo server 130 and a network 125.

In some implementations, the bingo system 100 includes a center device 110 that can be used to generate random numbers. In some implementations, the center device 110 includes a computer and/or a server. In some implementations, the center device 110 may comprise stand-alone computing devices. In some implementations, the center device 110 can be client terminals in a client/server system. In some implementations, center device 110 may include, but are not limited to, interface devices such as computer monitors, touch screens, buttons, etc. In some implementations, center device 110 may include one or more processors, one or more types of non-transitory memory devices (e.g., RAM, ROM, etc.), network interface devices, etc. By way of non-limiting example, the center device 110 may include one or more of a server, a desktop computer, a laptop computer, a handheld computer, a tablet computing platform, a NetBook, a Smartphone, a gaming console, and/or other computing platforms. In some implementations, the center device 110 may include one or more random number generator (RNG) modules such as a hardware random number generator, a software true random number generator, and/or a software pseudo random number generator. In some implementations, the RNG module is in communication with at least one processor of the center device 110. In some implementations, the RNG module of the center device 110 may vary depending on the type of game played at the EPIs. For example, in some implementations, the RNG module of the center device 110 is a roulette wheel with one or more balls. In implementations where the RNG module of center device 110 is a roulette wheel, a ball can be propelled around the roulette wheel and stop in one of the numbered pockets of the roulette wheel. The center device 110 may include a method to manually or automatically release the ball and detect the pocket number where the ball stopped. The center device 110 may detect the pocket where the balled stopped using techniques such as image recognition (e.g., using image or video capture and analyzing the image or video capture to determine the pocket number), embedded radio frequency identifiers (RFID) in the ball or roulette pockets, capacitance changes in roulette pockets, or other suitable detection techniques. In some implementations, the center device 110 may provide a remote live video feed of one or more roulette wheels in which outcomes generated at the remote roulette wheels can be transmitted to the center device 110 to use in a bingo game.

In some implementations, the RNG module of the center device 110 is a mechanical wheel with a plurality of segments around the wheel. The wheel can be spun and one or more of the segments of the wheel are determined to be selected in a variety of ways (e.g., the segment of the wheel that is displayed at the top of the wheel when the wheel has stopped spinning can be the selected RNG outcome). In some implementations, the RNG module of the center device 110 is a die popping or rolling mechanism. In some implementations, the RNG module of the center device 110 may include one or more die that are manually or automatically rolled to generate one or more random numbers (e.g., the numbers facing up on the one or more die). The selected random numbers on the die can be read in any suitable manner (e.g., using image recognition, electrical detection, etc.). In some implementations, the center device 110 may include a software true RNG module or software pseudo RNG module to generate random numbers for the bingo games that can be played on the bingo system 100. In some implementations, the center device 110 may include physical or video screen depictions of traditional looking physical random number generators (e.g., dice, roulette wheels, wheels, cards, etc.) that depict a random numbers generation sequence that was generated by a software true RNGs or a software pseudo RNGs. In some implementations, the bingo system 100 does not include a separate physical center device 110. In some implementations, one or more functions of the center device 110 (including its modules) can be moved into different devices of the bingo system 100. For example, in some implementations, one or more functions of the center device 110 can be incorporated into the bingo server 130, EPIs, or other suitable devices. In some implementations, the center device 110 is in communication with at least one bingo server, such as bingo server 130. In some implementations, the center device 110 is in communication with bingo server 130 over a network 125. In some implementations, center device 110 can be in communication with bingo server 130 using other suitable forms of communication.

In some implementations, the bingo system 100 may include one or more EPIs, such as EPI 120*a*, EPI 120*b*, EPI 120*c*, EPI 120*d*, EPI 120*e*, EPI 120*f*, EPI 120*g*, EPI 120*h*. In some implementations, EPIs are user interface devices that may comprise stand-alone computing devices. In some implementations, EPIs can be client terminals in a client/server system. EPIs can be used to accept player inputs for a game, such as game selections, wagers, player tracking cards, etc. EPIs may include, but are not limited to, player interface devices such as computer monitors, touch screens, buttons, card and ticket readers, ticket printers, etc. In some implementations, EPIs may include or be in communication with one or more cashless wallet systems (e.g., an ewallet) for accepting player funds that can be converted credits or chips for wagers. EPIs may include one or more processors, one or more types of non-transitory memory devices (e.g., RAM, ROM, etc.), network interface devices, etc. By way of non-limiting example, given EPIs may include one or more of a server, a desktop computer, a laptop computer, a handheld computer, a tablet computing platform, a NetBook, a Smartphone, a gaming console, and/or other computing platforms. In some implementations, the EPIs may be associated with certain other EPIs as shown in FIG. 1A. In some implementations, associated EPIs can be used to play one or more games. In some implementations, associated EPIs can be used to interact as part of a common game theme, such as a roulette game, wheel spinning game, a dice-based game, card games, etc. In some implementations, EPIs can be configured to provide technological aids to play bingo games. For example, associated EPIs may enable players to play bingo games structure to resemble a traditional casino game, such as roulette. In some implementations, the one or more EPIs may be associated with the center device 110. As shown in FIG. 1A, EPI 120*a*, EPI 120*b*, EPI 120*c*, EPI 120*d*, EPI 120*e*, EPI 120*f*, EPI 120*g*, EPI 120*h* are positioned around a center 110. While eight EPIs are depicted around center device 110, it should be appreciated that a center may have more or fewer associated EPIs. In some implementations, as illustrated in FIG. 1A, EPI 120*a*, EPI 120*b*, EPI 120*c*, EPI 120*d*, EPI 120*e*, EPI 120*f*, EPI 120*g*, and EPI 120*h* can be positioned around a center device 110 including a physical roulette module that is used to generate random numbers for a bingo-based roulette game. Players at these EPIs can be permitted to participate in a same bingo-based roulette game. In some implementations, the one or more EPIs are in communication with a center such as center device 110 via one or more networks, such as network 125 (as will be described further in FIG. 1B). In some implementations, the EPIs may communicate with the center device 110 to determine game functions like game timers (e.g., timers that determine when a player can place a wager in a bingo game). The EPIs may communicate with the center device 110 to determine when one or more random numbers will be drawn for a bingo game. In some implementations, one or more of the EPIs are also in communication with a bingo server, such as bingo sever 130. In some implementations, the EPIs are in communication with the bingo server 130 via network 125. In some implementations, the EPIs communicate with the bingo server 130 to determine, among other game features and functions, active bingo sessions and obtain custom bingo cards.

In some implementations, the bingo system 100 includes at least one bingo server such as bingo server 130. The bingo server 130 may include, but is not limited to, a bingo game engine module, a bingo session manager module, and a bingo management terminal module. The bingo server 130 may include other features and functions used to run a bingo game. Some aspects of the bingo server are further described in connection with FIG. 3.

In some implementations, the bingo system 100 includes at least one network such as network 125, which can be used to communicate between one or more devices or nodes in the bingo system 100. In some implementations, the devices or nodes in the bingo system 100 may include, but are not limited to, EPIs and center devices as described above. In some implementations, network 125 is at least one local area network (LAN). In some implementations, network 125 is a plurality of LANs. In some implementations, the network 125 is at least one wide area network (WAN). In some implementations, network 125 is a plurality of WANs. In some implementations, network 125 is a combination of one or more LAN and one or more WAN networks. In some implementations, the LAN and/or WAN one or more networks are hardwired networks (e.g., Ethernet™, fiber optic, etc.). In some implementations, one or more LAN and/or WAN networks can be a suitable wireless network (e.g., cellular, WiFi™, Bluetooth™, satellite, etc.). For example, the bingo server 130 may communicate with the center device 110 through one or more network devices (e.g., routers, switches, etc.) in one or more LAN environments, one or more WAN environments, or some combination of the foregoing. In some implementations, for example, where the bingo server 130 is located in a casino in certain proximity to the center device 110, the two devices may communicate over one or more LANs. In some implementations, where the bingo server 130 is not physically located at the casino where the center device 110 is located, the two devices may communicate over one or more LANs and one or more WANs (e.g., the Internet and/or private networks). It should be appreciated that any suitable network environment can be used for communication between various devices or nodes in the bingo system 100.

Figure 1B:
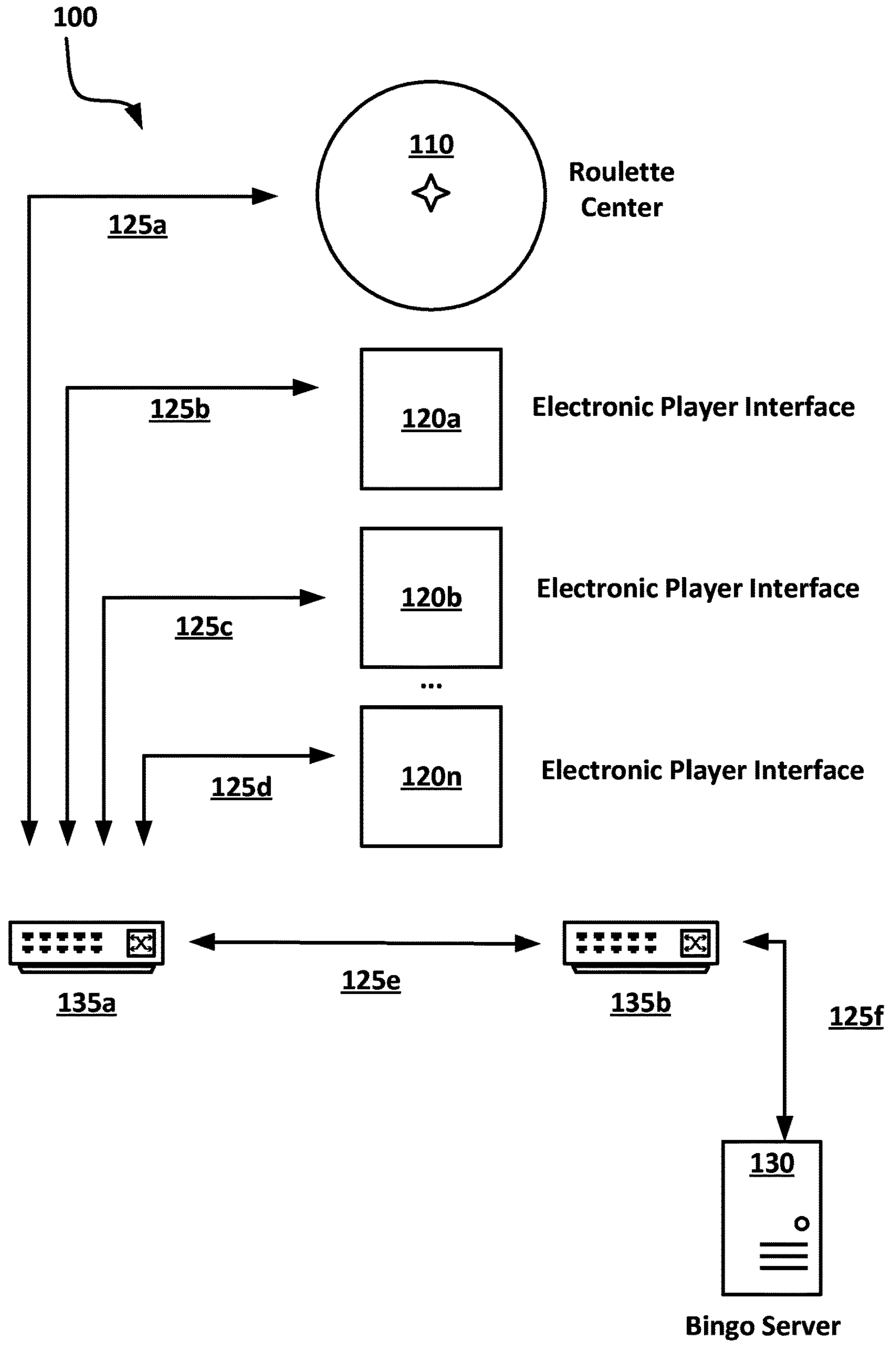
FIG. 1B illustrates a network diagram of a system of FIG. 1A, according to some implementations of the present disclosure.

FIG. 1B illustrates an example network diagram of a system of FIG. 1A, according to some implementations of the present disclosure. In some implementations, network 125 of FIG. 1A is shown in segments connecting various devices/nodes of the bingo system 100. For example, FIG. 1B illustrates network link 125*a*, network link 125*b*, network link 125*c*, network link 125*d*, network link 125*e*, and network link 125*f*. It should be appreciated that the bingo system 100 may include more or fewer network links. In some implementations, the center device 110 may connect to network 125 via network link 125*a* to switch 135*a*. EPI 120*a* may connect to network 125 via network link 125*b* to switch 135*a*. Similarly, other EPIs such as EPIs through EPI 120*n*, may connect to network 125 via their own network links such as network link 125*d* to switch 135*a*. The network links enable the devices in bingo system 100 to communicate with each other. As noted above, the network links can be hardwired, wireless, or some combination of the foregoing. For example, in some implementations, network link 125*a* can be an Ethernet™ connection and network link 125*b* can be a WiFi™ connection. As a further example, in some implementations, there can be proximity wireless communications such as with Bluetooth™ between center device 110 and one or more of the EPIs.

In some implementations, switch 135*a* communicate with another switch 135*b* via network link 125*e*. In some implementations, bingo server 130 connects to switch 135*b* via network 125*f*. While switch 135*a* and switch 135*b* are described herein as switches, these devices can be replaced with routers or other suitable network equipment in some implementations. In some implementations, switch 135*b* may connect with other switches (not shown) that are in communication with one or more other center devices and one or more other EPIs. It should be appreciated that more or fewer network links (125*a*, 125*b*, etc.) and network equipment (e.g., switch 135*a* and switch 135*b*) can be used to connect the devices shown in FIG. 1B. The quantity and types of connections and network equipment described herein and shown in FIG. 1B are merely for illustration purposes, and the type and quantity of network elements may change depending on the necessary network design requirements. For example, in some implementations, bingo server 130 may connect via a network link directly to switch 135*a*. In some implementations, bingo server 130 may be configured remotely in the cloud and devices/nodes such as center device 110 and EPIs (e.g., EPI 120*a* . . . EPI 120*n*, etc.) may communicate with the bingo server 130 via one or more switches, routers, etc. through a public or private network. In some implementations with more than one center device 110 with associated EPIs, different center devices and their associated EPIs may connect to a respective switch, which switches can be in communication with switch 135*b*, which provides communication to the bingo server 130. An example illustrating multiple center devices is discussed below in FIG. 2.

Figure 1C:
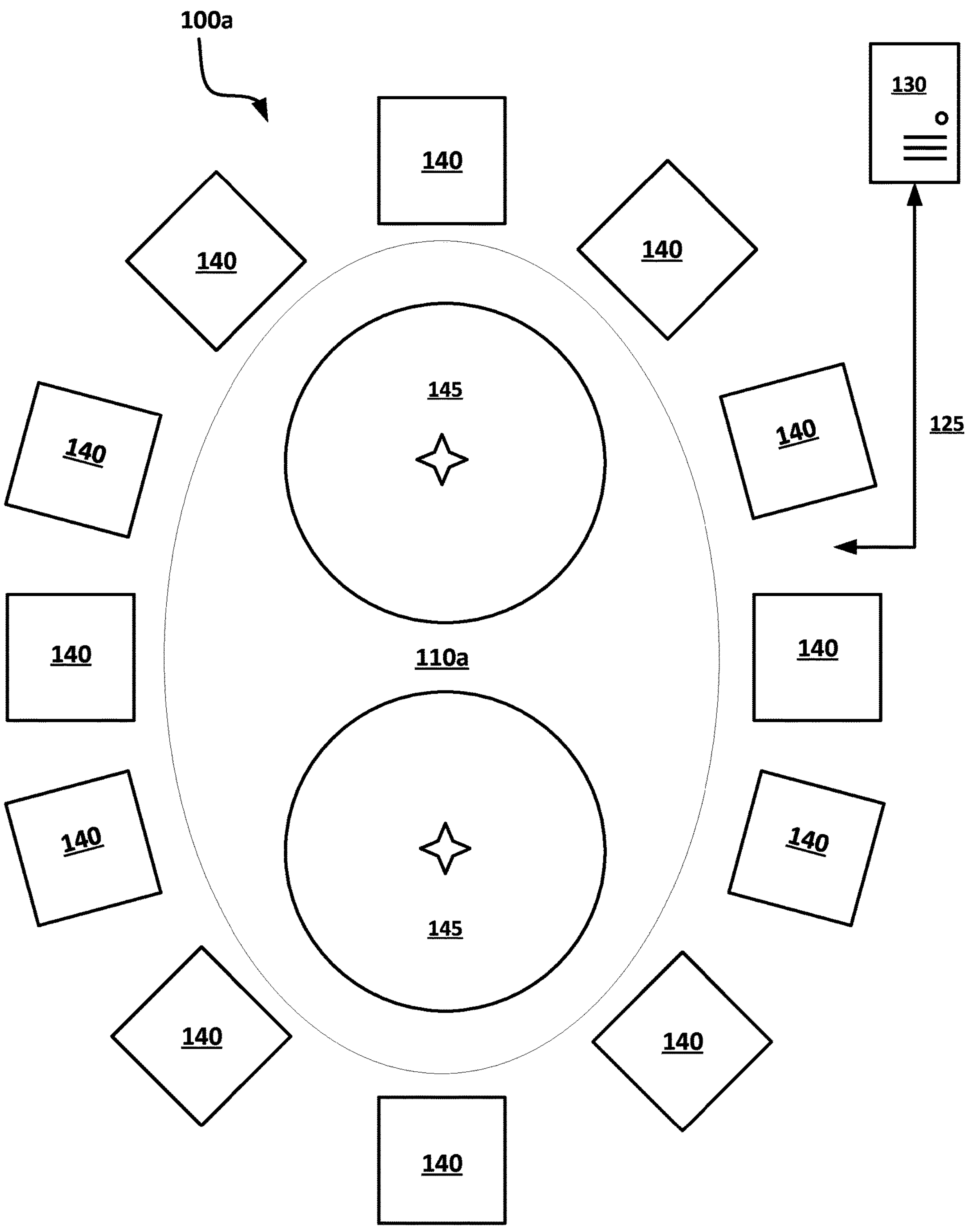
FIG. 1C illustrates an alternative system of FIG. 1A, according to some implementations of the present disclosure.

FIG. 1C illustrates an alternative system of FIG. 1A, according to some implementations of the present disclosure. In some implementations, a bingo system 100*a* may include a center device 110*a*, a plurality of EPIs 140. The bingo system 100*a* include a bingo server 130 and a network 125. In some implementations, the bingo server 130 in FIG. 1C is the same or similar to the bingo server 130 discussed in FIG. 1A. In some implementations, the network 125 in FIG. 1C is the same or similar to the network 125 discussed in FIG. 1A. In some implementations, the plurality of EPIs 140 in FIG. 1C is the same or similar to the EPIs discussed in FIG. 1A. In some implementations, the bingo system 100*a* differs from the bingo system 100 in FIG. 1A because the center device 110*a* include more than one RNG. For example, in some implementations, with the RNG is a roulette wheel, the center device 110*a* may include two or more roulette wheels such as roulette wheels 145. In some implementations, the functionality of the center device 110*a* is the same or similar to that of the center device 110.

In some implementations, as shown in FIG. 1C, where the center device 110*a* include multiple roulette wheels, players as EPIs 140 may place wagers on both roulette wheels 145 for a same active bingo game session (e.g., an interim bingo game).

In some implementations, a wager on one RNG is kept separate from a wager on the other RNG. For example, if a first wager is placed for a first roulette wheel and a second wager is placed for a second roulette wheel, the evaluation of the outcome of the first wager will be based on the ball from the first roulette wheel. Likewise, in some implementations, the evaluation of the outcome of the second wager will be based on the ball from the second roulette wheel.

In some implementations, alternative creative wagering scenarios can be created that enable the player to wager on combined outcomes from one or more RNG devices, such as RNGs devices 145.

In some implementations, the RNGs for the center device 110*a* can be different. For example, in some implementations, center device 110*a* may include a first RNG device that is a roulette wheel and may also include a second RNG device that is a dice based RNG. In some implementations, one or more of the RNGs can be a software based RNG.

Figure 2:
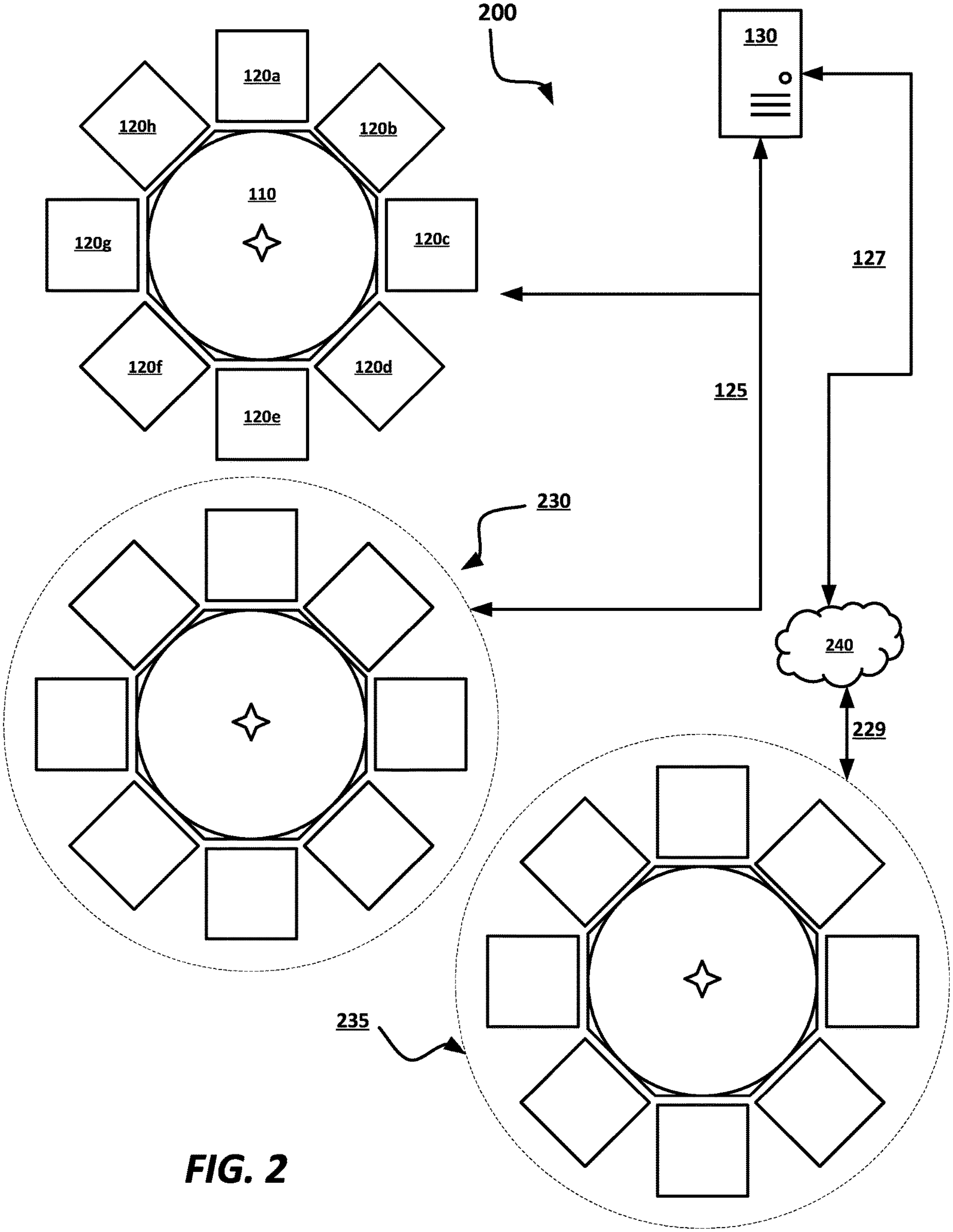
FIG. 2 illustrates a system, according to some implementations of the present disclosure.

FIG. 2 illustrates a system, according to some implementations of the present disclosure. In some implementations, the bingo system 200 includes the center device 110 and EPI 120*a*, EPI 120*b*, EPI 120*c*, EPI 120*d*, EPI 120*e*, EPI 120*f*, EPI 120*g*, and EPI 120*h* discussed in connection with FIG. 1A. As illustrated in FIG. 2, the bingo system 200 may also include one or more additional center devices and EPIs associated with the respective one or more additional center devices. For example, as illustrated in FIG. 2, in some implementations, bingo system 200 includes a center device and a plurality of associated EPIs illustrated as bingo center grouping 230. In some implementations, the devices in bingo center grouping 230 may be the same or similar to the devices described in FIG. 1A and FIG. 1B. In some implementations, the devices in bingo center grouping 230 may be different from the devices described in FIG. 1A and FIG. 1B. In some implementations, bingo system 200 also includes one or more other bingo center groupings such as bingo center grouping 235. In some implementations, the devices in bingo center grouping 235 may the same or similar to the devices described in FIG. 1A and FIG. 1B. In some implementations, the devices in bingo center grouping 235 may be different from the devices described in FIG. 1A and FIG. 1B. It should be appreciated that the bingo system 200 may include any suitable quantity of fewer or additional bingo center groupings. In some implementations, as illustrated in FIG. 2, bingo center grouping 230 may communicate with the bingo server 130 via network 125. Thus, in some implementations, the bingo center grouping described in FIG. 1A and FIG. 1B may communicate on the same network as center grouping 230. In some implementations, as illustrated in FIG. 2, bingo center grouping 235 may also communicate with the bingo server 130. However, in some implementations, center grouping 235 may communicate with the bingo server 130 via one or more different networks from network 125. As illustrated in FIG. 2, in some implementations, the bingo center grouping 235 may be connected to network link 229. In some implementations, the network link 229 may be connected to a network 240. In some implementations, the network link 229 can be a WAN connection to network 240. Network 240 is illustrated as a cloud network. In some implementations, network 240 may be a public network, a private network, or some combination of the forgoing. In some implementations, the bingo server 130 may be in communication with the network 240 via network link 127. In some implementations, the network link 127 can be a WAN connection to network 240. While bingo system 200 is illustrated as having one bingo server 130, it should be appreciated that bingo system 200 may include one or more bingo servers to service the one or more bingo center groupings.

Figure 3:
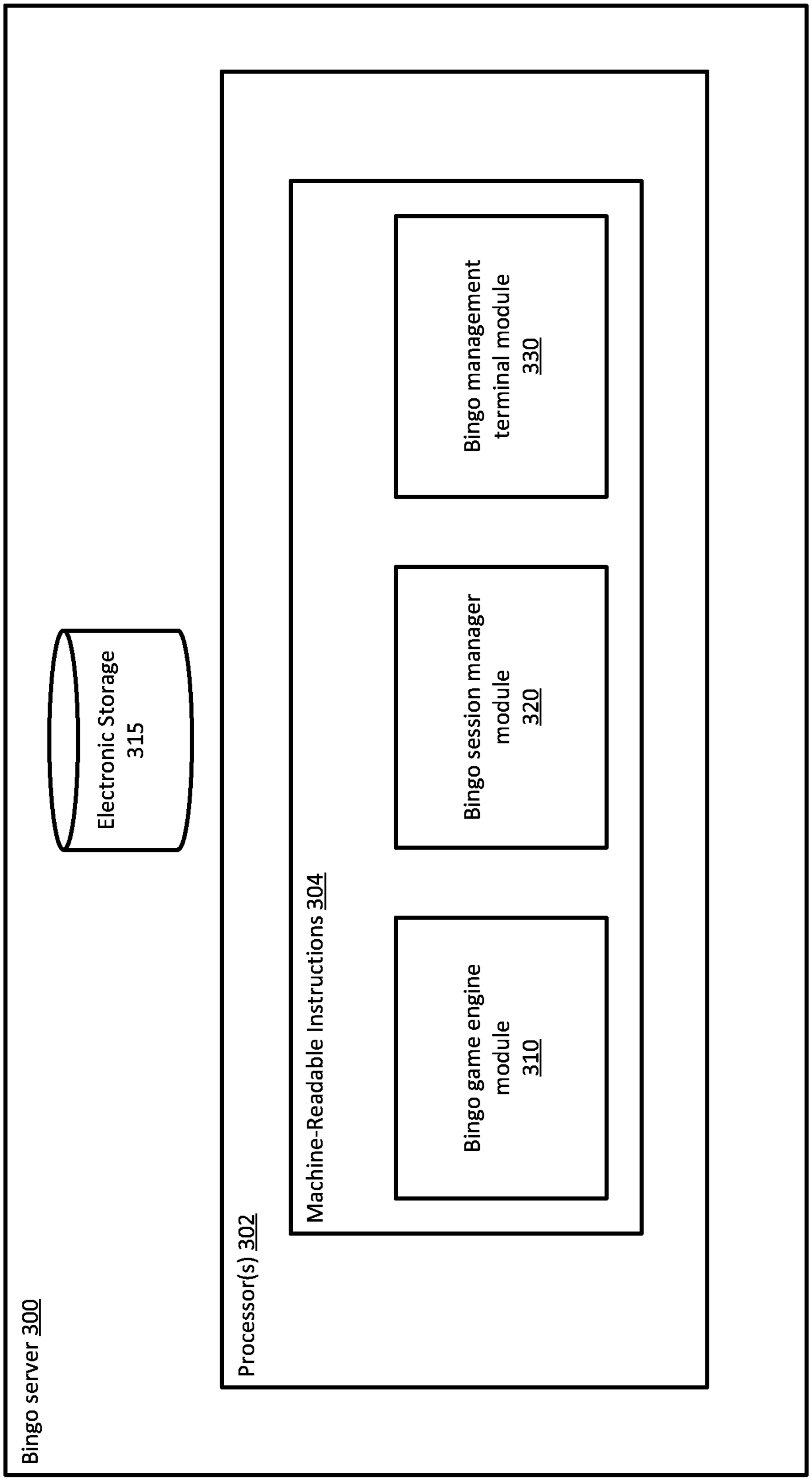
FIG. 3 is a block diagram illustrating a bingo server, according to some implementations of the present disclosure.

FIG. 3 is a block diagram illustrating a bingo server, according to some implementations of the present disclosure. In some implementations, bingo server 300 in FIG. 3 is one possible representation of bingo server 130 previously discussed. In some implementations, bingo server 300 may include one or more computing platforms. Bingo server 300 may be configured to communicate with one or more devices (e.g., EPIs, centers, etc.) according to a client/server architecture, a peer-to-peer architecture, and/or other suitable architectures. Users may access bingo server 300 via certain devices (e.g., EPIs and/or other suitable devices) as discussed herein. In some implementations, the bingo server

300 may include one or more processers 302, one or more electronic storage devices 315 (e.g., non-transitory memory devices), and machine-readable instructions 304. In some implementations, the bingo server 300 may include a bingo game engine module 310, a bingo session manager module 320, and a bingo management terminal module 330.

Bingo server 300 may be configured by machine-readable instructions 304. Machine-readable instructions 304 may include one or more instruction modules. The instruction modules may include computer program modules. The instruction modules may include one or more of a bingo game engine module 310, a bingo session manager module 320, and a bingo management terminal module 330, and/or other instruction modules.

In some implementations, bingo game engine module 310 is configured to execute and run in the background on the bingo server 300 to service bingo game play requests from devices in a bingo system (e.g., bingo system 100) such as one or more EPIs (e.g., EPI 120*a*, EPI 120*b*, etc.) and centers devices (e.g., center device 110). In some implementations, the bingo server 300 communicates with devices in a bingo system using the bingo game engine module 310 via secure and encrypted communications. In some implementations, the secure encrypted communications can be provided with Transport Layer Security (TLS). Other suitable communication methods with or without security can be used in various implementations. In some implementations, the bingo game engine module 310 loads into memory Server Loadable Math (SLM) data files for bingo games and associated math models to be installed at a specific site. In some implementations, the SLM may contain encrypted, signed data files for bingo game prize schedules and associated information for one or more different game themes. In some implementations, the bingo game engine module 310 uses one or more databases, such as Microsoft™ SQL Server databases, for holding ancillary and core data for operating the bingo game engine module 310 and related components of the bingo server 300. In some implementations, the databases associated with the bingo game engine module 310 can also serve as a repository for bingo game transactional data. In some implementations, a bingo server 300 may include one or more running instances of a bingo game engine module 310.

In some implementations, bingo session manager module 320 is configured to execute and run in the background on the bingo server 300 to service bingo game play requests from the bingo game engine module 310. In some implementations, the bingo session manager module 320 is associated with one or more databases, such as Microsoft™ SQL Server databases, to store ancillary and core data used in operating the bingo session manager module 320 as well as serving as a repository for transactional data about all bingo game plays at the bingo session manager module 320.

In some implementations, the bingo session manager module 320 may be configured to connect with one or more bingo game engine modules 310 depending on factors such as technical, regulatory, and/or other business needs. The bingo session manager module 320 may exist on the same physical server as a bingo game engine module 310 or on a physically separate server. In some implementations, the bingo session manager module 320 can maintain the active, configurable session of a plurality of open bingo games in a current bingo session. In some implementations, the bingo session manager module 320 can be configured to, among other things: determine when to open and start a new bingo game with 2 or more players (e.g., for a bingo game qualify for class II classification, a new bingo game is started with a minimum of two players to establish a quorum); decide how to best join play requests from the EPIs to available bingo games with active bingo sessions; draw one or more bingo balls in a bingo game (e.g., randomly generate numbers for the bingo balls); create custom bingo cards; issue custom bingo cards bingo cards used to play in a bingo game; evaluate created custom bingo cards to confirm that duplicate custom bingo cards are not sold or played (e.g., where bingo session manager module 320 creates a custom bingo card, the bingo session manager module 320 can verify that the custom created bingo card does not have the same numbers in the same sequence used in a bingo game cycle—where the bingo game cycle encompasses the start of play of a bingo game through the conclusion after achievement of a game winning pattern/game ending pattern); and/or evaluate custom bingo cards played for wins and/or a game ending pattern.

In some implementations, bingo management terminal module 330 is configured to communicate with the bingo game engine module 310 to facilitate installation, configuration, reporting, and troubleshooting of the various devices in a bingo system (e.g., bingo system 100 or bingo system 200). In some implementations, the bingo management terminal module 330 provides a user interface that allows an operator to enable or disable EPIs that are connected to the bingo server 300. In some implementations, this user interface can also display system events such as end of day and device connections errors in a bingo system. In some implementations, the bingo management terminal module 330 may enable an operator of a bingo system to enable or disable any installed bingo game paytables (e.g., SLM data files). In some implementations, the user interface in the bingo management terminal module 330 can be configured to enable an authorized user to generate, review and export various accounting and system reports for a bingo system.

While certain features and functions of the bingo game engine module 310, bingo session manager module 320, and/or bingo management terminal module 330 were described, it should be appreciated that the features and functions of these modules are not limited. Furthermore, additional features and functions of the bingo server 300 and its modules will be described in further detail below.

In some implementations, bingo server 300 may be operatively linked to other devices via one or more electronic communication links (e.g., network link 125). For example, such electronic communication links may be established, at least in part, via a network such as the Internet and/or other networks. It will be appreciated that this is not intended to be limiting, and that the scope of this disclosure includes implementations in which bingo server 300 may be operatively linked to other devices via some other communication media. In some implementations, bingo server 300 may be operatively linked to other bingo servers via suitable communication media. By way of non-limiting example, given bingo server 300 may include one or more of a server, a desktop computer, a laptop computer, a handheld computer, a tablet computing platform, a NetBook, a Smartphone, a gaming console, and/or other computing platforms.

Bingo server 300 may include electronic storage 315, one or more processors 302, and/or other components. Bingo server 300 may include communication lines, or ports to enable the exchange of information with a network and/or other computing platforms. Illustration of bingo server 300 in FIG. 3 is not intended to be limiting. Bingo server 300 may include a plurality of hardware, software, and/or firmware components operating together to provide the functionality attributed herein to bingo server 300. For example, bingo server 300 may be implemented by a cloud of computing platforms operating together as bingo server 300.

Electronic storage 315 may comprise non-transitory storage media that electronically stores information. The electronic storage media of electronic storage 315 may include one or both of system storage that is provided integrally (i.e., substantially non-removable) with bingo server 300 and/or removable storage that is removably connectable to bingo server 300 via, for example, a port (e.g., a USB port, a firewire port, etc.) or a drive (e.g., a disk drive, etc.). Electronic storage 315 may include one or more of optically readable storage media (e.g., optical disks, etc.), magnetically readable storage media (e.g., magnetic tape, magnetic hard drive, etc.), electrical charge-based storage media (e.g., EEPROM, RAM, etc.), solid-state storage media (e.g., flash drive, etc.), and/or other electronically readable storage media. Electronic storage 315 may include one or more virtual storage resources (e.g., cloud storage, a virtual private network, and/or other virtual storage resources). Electronic storage 315 may store software algorithms, information determined by processor(s) 302, information received from bingo server 300, information received from other devices (e.g., EPIs, centers, etc.), and/or other information that enables bingo server 300 to function as described herein.

Processor(s) 302 may be configured to provide information processing capabilities in bingo server 300. As such, processor(s) 302 may include one or more of a digital processor, an analog processor, a digital circuit designed to process information, an analog circuit designed to process information, a state machine, and/or other mechanisms for electronically processing information. Although processor (s) 302 is shown in FIG. 3 as a single entity, this is for illustrative purposes only. In some implementations, processor(s) 302 may include a plurality of processing units. These processing units may be physically located within the same device, or processor(s) 302 may represent processing functionality of a plurality of devices operating in coordination. Processor(s) 302 may be configured to execute bingo game engine module 310, bingo session manager module 320, bingo management terminal module 330, and/or other modules. Processor(s) 302 may be configured to execute bingo game engine module 310, bingo session manager module 320, bingo management terminal module 330, and/or other modules by software; hardware; firmware; some combination of software, hardware, and/or firmware; and/or other mechanisms for configuring processing capabilities on processor(s) 302. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although bingo game engine module 310, bingo session manager module 320, bingo management terminal module 330 are illustrated in FIG. 3 as being implemented within a single processing unit, in implementations in which processor(s) 302 includes multiple processing units, one or more of bingo game engine module 310, bingo session manager module 320, bingo management terminal module 330 may be implemented remotely from the other modules. The description of the functionality provided by the different bingo game engine module 310, bingo session manager module 320, and/or bingo management terminal module 330 described below is for illustrative purposes, and is not intended to be limiting, as any of bingo game engine module 310, bingo session manager module 320, and/or bingo management terminal module 330 may provide more or less functionality than is described. For example, one or more of bingo game engine module 310, bingo session manager module 320, and/or bingo management terminal module 330 may be eliminated, and some or all of its functionality may be provided by other ones of bingo game engine module 310, bingo session manager module 320, and/or bingo management terminal module 330. As another example, processor(s) 302 may be configured to execute one or more additional modules that may perform some or all of the functionality attributed below to one of bingo game engine module 310, bingo session manager module 320, and/or bingo management terminal module 330.

Figure 4:
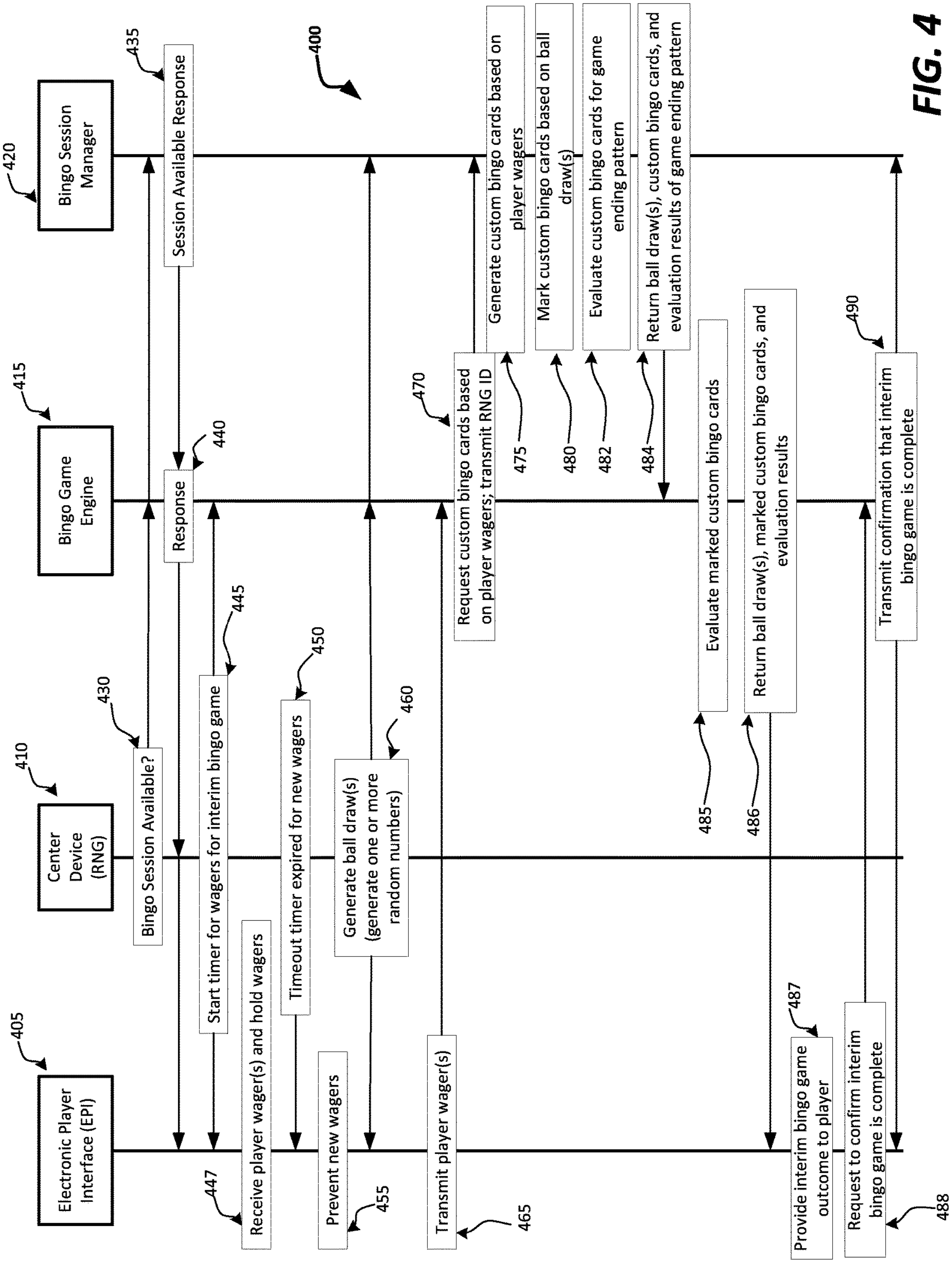
FIG. 4 illustrates communications and processes between different devices of an improved bingo system, according to some implementations of the present disclosure.

FIG. 4 illustrates communications and processes between different devices of an improved bingo system, according to some implementations of the present disclosure. The devices and modules discussed in FIG. 4 may correspond to the devices and modules discussed in FIG. 1A, FIG. 1B, FIG. 2, FIG. 3 in various implementations. Further, FIG. 4 will be described in connection with FIG. 6A-FIG. 6F and FIG. 7 to provide a visual guide to some aspects of the operation of the improved bingo system. In some implementations, the improved bingo system can be configured to provide a bingo-based roulette game. FIG. 4, FIG. 6A-FIG. 6F, and FIG. 7 will be discussed in view of an implementation of a bingo-based roulette game. However, it should be appreciated that the improved bingo system disclosed herein can be used to convert other traditional casino games into suitable types of bingo-based games, such as a big wheel, craps, etc.

In some implementations, the bingo system (e.g., interchangeable with bingo system 100, bingo system 100*a*, bingo system 200, etc.) may include devices and systems such as, but not limited to, EPI 405, center device 410, bingo game engine 415, and/or bingo session manager 420. As discussed above, in some implementations, a bingo game engine and a bingo session manager can be configured in one computing device or in different computing devices. The process 400 illustrated in FIG. 4 is described in the context of a single EPI (EPI 405 interacting with the other devices and systems of the bingo system) to enable a player to play a bingo game (e.g., a bingo-based roulette game). It should be appreciated, as discussed in herein, that a bingo system can have more than one EPI and the process described herein can be applied to other EPIs, enabling a plurality of players to play the improved bingo game.

In some implementations, at block 430 center device 410 may send a request to the bingo game engine 415 to determine whether an active bingo session in bingo game is available for the player to join. In implementations of class II bingo games, a bingo game can be started when two or more players start a bingo game. The bingo game can be continued until a player in the bingo game obtains a bingo card with a game winning pattern (e.g., a pattern on a bingo card that causes the bingo game to terminate; also referred to herein as a game ending pattern or a bingo game terminating event). Obtaining a bingo card with a game ending pattern is a bingo game terminating event (e.g., causing a bingo game cycle to end). In some implementations, once a bingo game has started, interim bingo games can be continuously played under a bingo game cycle (a bingo game cycle may encompass the start of a bingo game with at least two players through to a bingo game terminating event). Interim bingo games within a bingo game (or a bingo game cycle) can be played in active bingo game sessions (as referred to herein as active bingo sessions). In some implementations, once a bingo game has been started, single players can participate in active bingo sessions (e.g., single players can play interim bingo games without additional players). In some implementations, a bingo server (e.g., bingo session manager 420) can be configured to manage active bingo sessions and assign center devices (e.g., center device 410) and associated EPIs to active bingo sessions or help players create new bingo games to hold new active bingo sessions (e.g., to play interim bingo games).

Returning to the request sent by the center device 410 at block 430, in some implementations, the bingo game engine 415 transmits the message requesting whether the bingo sessions are available to the bingo session manager 420. It should be appreciated, that in some implementations, the bingo game engine 415 serves as the system that interfaces with devices such as EPIs (e.g., EPI 405) and center devices (e.g., center device 410). In some implementations, if the bingo session manager 420 determines that no active bingo sessions are available, the bingo session manager 420 may respond to the bingo game engine 415 that no active bingo sessions are available (not shown). In some implementations, the bingo game engine 415 may send a message to the center device 410 alerting center device 410 that no bingo sessions are available. In some implementations, center device 410 may send messages to EPI 405 to alert players that a bingo game can be started when at least one additional player joins the bingo game. In some implementations, the player is located at another EPI associated with the center device 410. In alterative implementations, the player can be located at another EPI associated with a different center device.

Returning to block 435, in some implementations, if the bingo session manager 420 determines that an active bingo session is available for the center device 410 to join, the bingo session manager 420 can add the center device 410 to an active bingo session. In some implementations, once center device 410 is added to an active bingo session, the bingo session manager 420 may lock the active bingo session and limit the addition of players to the active bingo session to players at certain EPIs. In some implementations, locking the active bingo session is used where one or more EPIs may use a common ball draw mechanism. For example, as shown in FIG. 1A, if players are located at EPI 120*a* and EPI 120*d*, these players might expect to participate in a bingo-based game using the center device 110 (e.g., using a roulette based ball draw) rather than being added to an active bingo session associated with a different center device (e.g., a remote center device associated with bingo center grouping 235 shown in FIG. 2). In some implementations, the bingo session manager 420 sends a response to the bingo game engine 415 indicating that the center device 410 has been added to an active bingo session. In some implementations, the response may include a bingo game session ID for the active bingo session. As illustrated in block 440, the bingo game engine 415 may generate one or more responses notifying other devices in the bingo system that the center device 410 has been added to an active bingo session (including providing information such as a bingo game session ID). As illustrated at block 440, the bingo game engine may send the response to the center device 410 that the center device 410 has been added to an active bingo session. As also illustrated, the center device 410 may also send the response about the active bingo session to EPI 405.

Figure 6A:
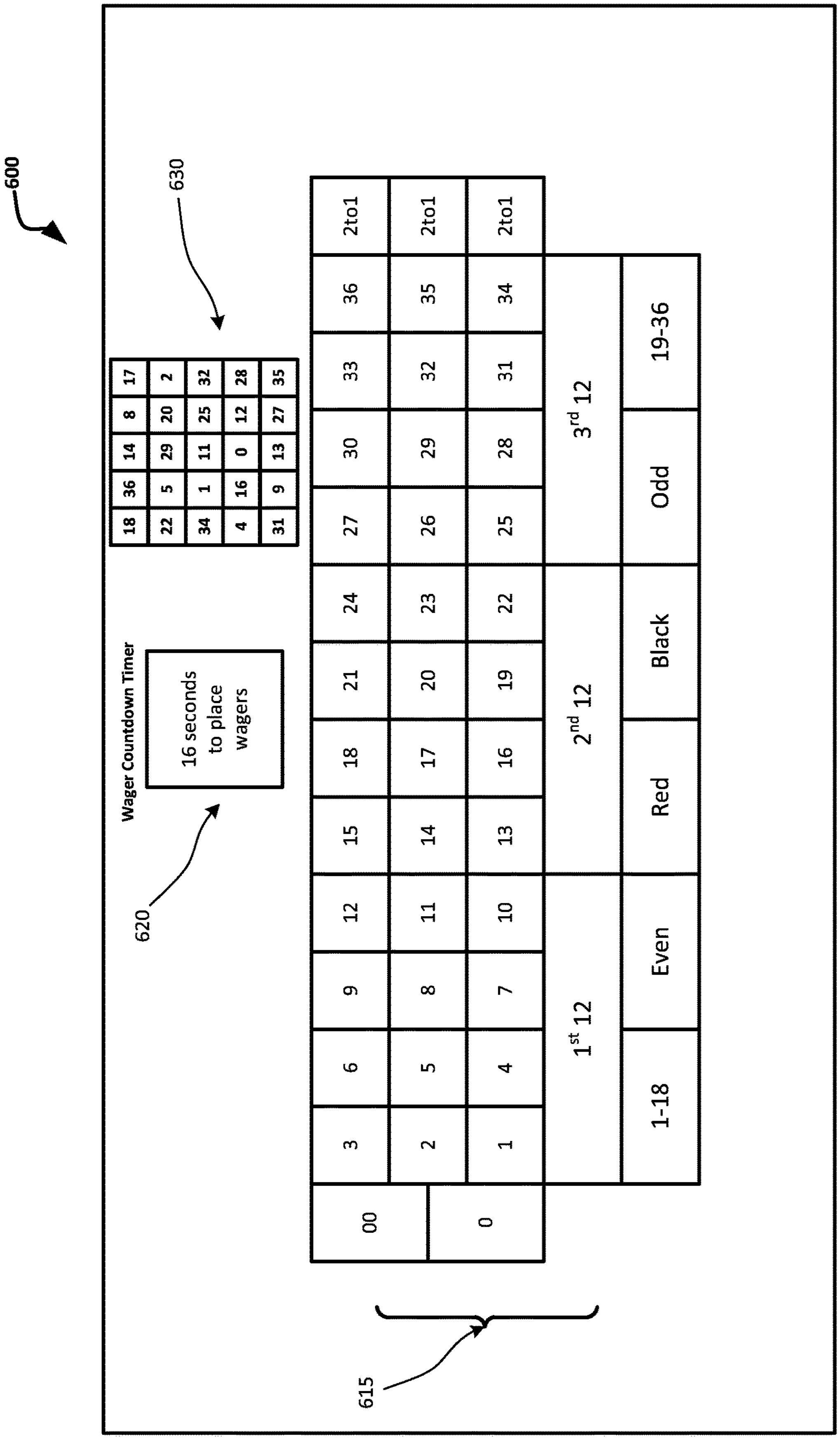
FIG. 6A is an illustration of a roulette user interface that can be used in connection with some systems and methods, according to some implementations of the present disclosure.

In some implementations, as shown at block 445, the center device 410 may start a wager timer for an interim bingo game for the assigned active bingo session. In some implementations, the wager timer creates a period of time in which one or more players can place bets/wagers at EPIs for an active bingo session. For example, the wager timer can be a countdown timer that tells players at certain EPIs that they have 25 seconds (or any other suitable amount of time) to place one or more wagers before a bingo ball draw event is triggered for an active bingo session. It should be appreciated that any suitable time period can be used for the wager timer period. In some implementations, once the wager timer period ends (e.g., a countdown timer reaches 0, a timer reaches 25 seconds, etc.), players are prevented from placing new wagers at EPIs. An example of the wager countdown timer shown to the player at an EPI is illustrated at wager countdown timer 620 in FIG. 6A. In FIG. 6A, wager countdown timer 620 alerts the player that the player has 16 seconds remaining to place wagers. In some implementations, receiving the message about the player at EPI 405 getting added to an active bingo session can be used as a triggering mechanism for center device 410 to start the wager timer. In some implementations, the center device 410 may also transmit a message to the bingo game engine 415 to alert the bingo game engine 415 that a timer was started for the active bingo session for players to place wagers. In some implementations, the center device 410 may also transmit a message to the EPI 405 that the timer was started for the active bingo session for players to place additional wagers. In some implementations, the center device 410 may transmit the same or similar message to one or more other EPIs associated with center device 410 that the timer was started for the active bingo session for players to place additional wagers. The EPI 405 may alert the player that new wagers for the active bingo session will be permitted until the wager timer period ends. The EPI 405 may accept one or more wagers from the player while the wager timer is running. In some implementations, when the wager timer has reached its limit, players will be prevented from placing additional wagers at EPIs associated with the center device 410.

In some implementations, EPI 405 provides a player interface that resembles a traditional casino game, such as a roulette game. For example, FIG. 6A illustrates a game screen 600 for a bingo-based roulette game that can be presented to a player at EPI 405 in some implementations. FIG. 6A shows a roulette table interface 615 in game screen 600, which provides the player with different possible ways to wager. For example, if a player selected the number “3” in the roulette table interface 615, the EPI 405 may register that as a straight bet in roulette. Similarly, if a player selected the Red in the roulette table interface 615, the EPI 405 may register that as a bet on Red in bingo-based roulette game. The numbers and other bet types displayed on the roulette table interface 615 is merely for illustration purposes. It should be appreciated that more or fewer types of bets can be included for the player to select. It should also be appreciated that different games, such as a craps game or a spin the wheel type game may involve presenting different interfaces to the player. Also note that bingo board 630 is presented in the game screen 600. In some implementations, the bingo board 630 may indicate a bingo game board used in a prior active bingo session.

Figure 6B:
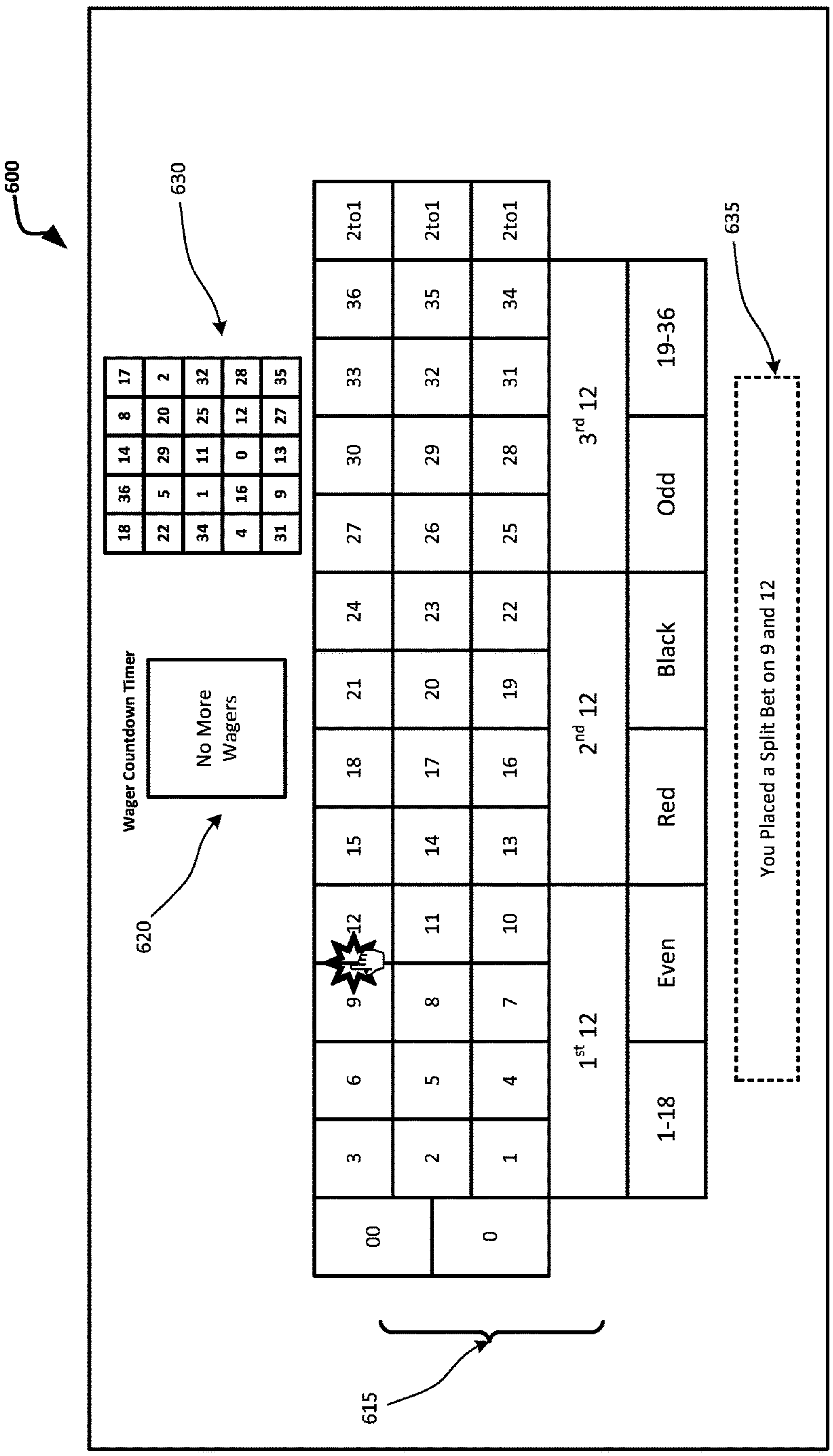
FIG. 6B is an illustration of a roulette user interface that can be used in connection with some systems and methods, according to some implementations of the present disclosure.

Returning to block 447, in some implementations, EPI 405 may wait for a player to make wager selections. In some implementations, the player interface of EPI 405 enables a player to make wager selections that resemble wagers in a roulette game. For example, in some implementations, the player interface of EPI 405 may show the player a layout of a virtual roulette table (e.g., roulette table interface 615 of FIG. 6A) for wagering and permit the player to make one or more wager selections on the virtual roulette table. For example, the player at EPI 405 can touch a place between two numbers on the roulette table interface on the EPI 405 to indicate selection of a split bet in the bingo-based roulette game. For example, FIG. 6B illustrates a player selecting a space between the "9" and the "12" for a split bet wager on the roulette table interface 615. While FIG. 6A-6F show a single wager, the player can place one or more wagers in various implementations. In some implementations, FIG. 6B illustrates alerting the player that they just placed a Split Bet wager on "9" and "12" as shown in message window 635. In some implementations, the message window can be shown in some other suitable way or format. In some implementations, the EPI does not provide a message to the player, but indicates the wager on the game board (e.g., displays a chip between the "9" and "12" as would be seen in a traditional roulette game board). The EPI 405 may also receive money from the player for the player's wager in a suitable manner. The player can place any suitable wager value on the Split Bet wager. It should be appreciated that other steps may be included in placing a wager/bet in various implementations.

As also illustrated at block 447, some implementations, EPI 405 may receive player's wager(s) and hold the player's wager. In some implementations, the EPI 405 is configured to hold the player's wager until after the bingo ball draw occurs. In some implementations, the player's wager can be eventually passed to the bingo server (e.g., bingo game engine 415 and/or the bingo session manager 420) as shown in block 465. In some implementations, by holding the player's wager until later in the bingo game process, the bingo system is rendered more efficient (e.g., enabling the bingo system to avoid more processor and memory intensive activities) if a malfunction occurs in a bingo game. If a player's wager is sent to the bingo server early in the game process, the player's wager may be recorded for financial auditing purposes at the bingo server. If a game malfunction occurs (e.g., a roulette ball cannot be released, the pocket of the roulette wheel where the ball landed cannot be read, a network interruption occurs, a player physical interferes with the roulette wheel, etc.) the bingo game or interim bingo game may need to be terminated early. If the bingo game or interim bingo game is terminated after the player's wager is recorded at the bingo server (e.g., bingo game engine 415 and/or bingo session manager 420), the bingo server handling player funds will refund the player. In some implementations, a player refund is recorded in a way that can be audited to create an audit trail. In some implementations, the audit creation process may cause the bingo server to process the refund to the player and record the refund in one or more transaction records stored in memory. In some implementations, recording the audit trail causes the one or more processors of the bingo server to calculate the refund using memory and processing power. In some implementations, the refund transaction also may be communicated to the EPI 405 (and to other EPIs, as applicable), creating additional network traffic and using additional processing and memory resources of the bingo server and the EPI 45. In some implementations, the EPI 405 may also undertake additional processor and memory resources processing the refund so that the player receives the refund. However, in implementations where a player's wagers can be held (e.g., at EPI 405 until after a ball draw sequence is confirmed), the bingo server can avoid one or more of the additional audit/refund processing steps and communication steps with the EPI 405, when a malfunction occurs. If a malfunction occurs before the player's wagers are sent to the bingo server, the EPI 405 can refund the player's wager without performing one or more of the audit/refund transactions noted above, creating a technological improvement over prior bingo systems from less processor and memory usage. When viewed in terms of multiple EPIs participating in an active bingo session, the reductions in processing and memory usage can be further increased where audit/refund processing is avoided for multiple players at different EPIs. It should also be appreciated that in some implementations, EPI 405 can be configured to transmit the player's wagers prior to the ball draw (not shown) or at other suitable times.

As illustrated at block 450, in some implementations, the center device 410 determined that the wager timer period has expired. In some implementations, the expiration of the wager timer may cause the center device 410 to transmit a message to EPI 405 that the wager timer period has ended. It should be appreciated that the center device 410 may also transmit the same or similar message to one or more other EPIs associated with center device 410. In some implementations, center device 410 may also transmit a message to the bingo game engine 415 that the wager timer period has ended for an active bingo session. In some implementations the bingo game engine 415 may transmit a message to the bingo session manager 420 alerting the bingo session manager 420 that the wager timer period has ended.

In some implementations, as shown at block 455, the EPI 405 may prevent the player from placing additional wagers for the active bingo session after receiving notice that the wager timer period has ended. An example of the wager timer period expiring is illustrated in FIG. 6B. FIG. 6B illustrates wager countdown timer 620 alerting the player that no more wagers can be placed as it can be provided to the player at EPI 405 in some implementations. As it should be appreciated, other EPIs associated with the center device 410 that are assigned to the active bingo session may also prevent players from placing additional wagers for the active bingo session.

Figure 6C:
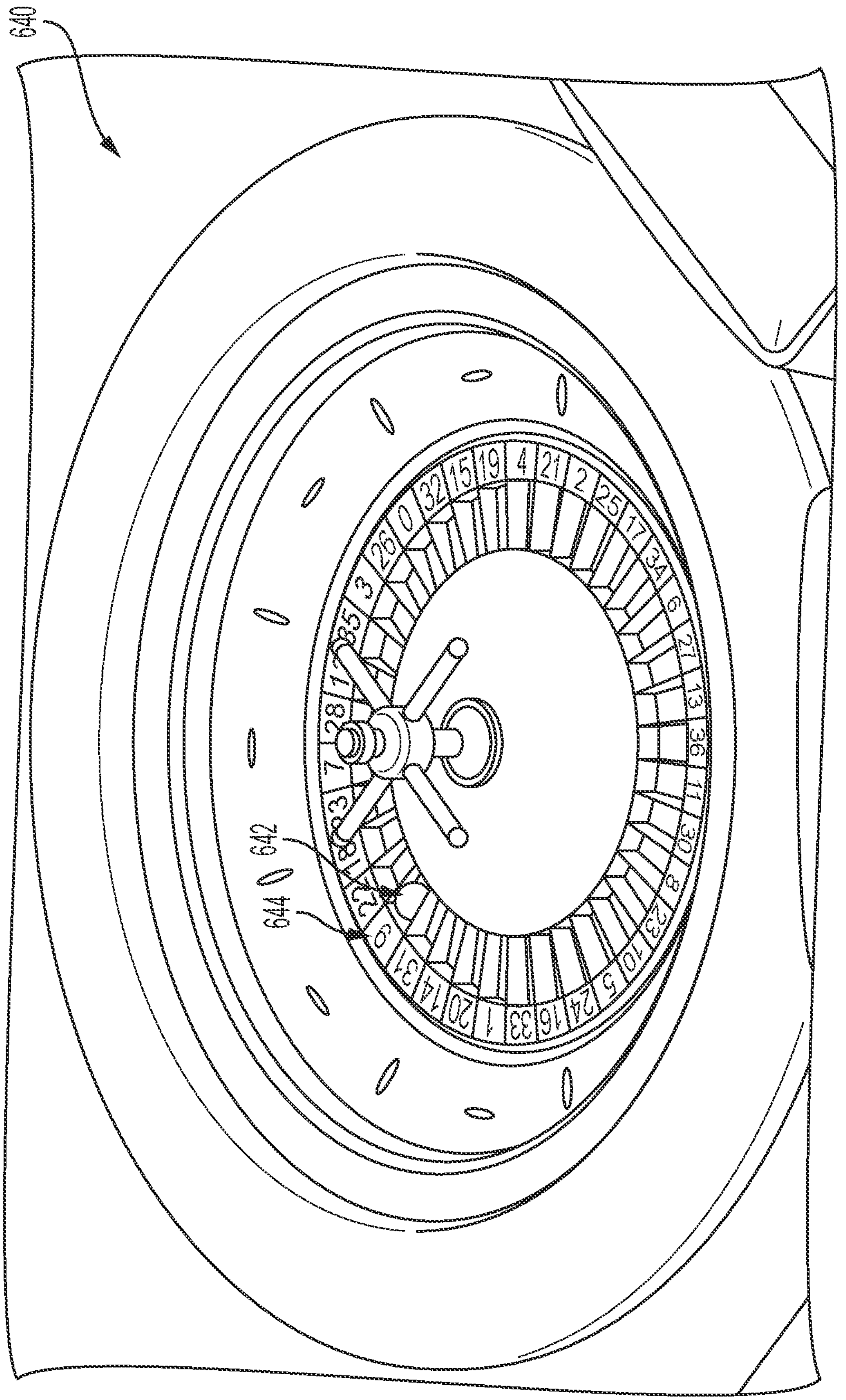
FIG. 6C is an illustration of a roulette style random number generator in a center that can be used in connection with some systems and methods, according to some implementations of the present disclosure.

In some implementations, after the wager timer period has ended, center device 410 may execute an RNG module to generate one or more random numbers for the bingo ball draw (e.g., an interim winning game pattern). As noted above, the RNG module can be a physical machine (e.g., dice, a roulette wheel, a selection wheel, etc.), a hardware RNG, or a software RNG. In some implementations with a physical roulette wheel, center device 410 may cause a ball to be inserted around the physical roulette wheel and cause the physical roulette wheel to spin for the bingo ball draw, as illustrated at block 460. In some implementations, when the roulette ball stops in a particular pocket around the physical roulette wheel, the center device 410 can automatically determine a number associated with the pocket where the ball stopped in the roulette wheel. In some implementations, the number associated with the pocket where the ball stopped can be used as a random number for the bingo game. An example physical roulette wheel 640 is illustrated in FIG. 6C. In FIG. 6C, a ball 642 was inserted in the physical roulette wheel 640 while the physical roulette wheel 640 was spinning. When the physical roulette wheel 640 and the ball 642 stopped, the ball 642 can be evaluated for the pocket in the physical roulette wheel 640 where the ball 642 stopped. As illustrated in FIG. 6C, the ball 642 stopped in a number 9 pocket 644 of the physical roulette wheel 640. In some implementations, a single ball is used to determine a single random number, which is used to determine the outcome of the interim bingo game for the active bingo session. In implementations where a single ball is used, it should be appreciated that this creates a technological improvement over existing bingo systems. Bingo games traditionally use multiple balls to generate multiple random numbers (or use RNGs to generate multiple random numbers). In an improved bingo system that uses a single ball (or uses an RNG to generate a single random number) to determine single number game outcomes (e.g., for determining winning game patterns), less processing power and memory is used, when compared to prior bingo systems, to generate ball draws for the games used in the improved bingo system.

It should also be appreciated that in other implementations, one or more balls can be used to determine additional random numbers for the interim bingo game of the active bingo session. In some implementations, the physical roulette wheel can be spun with single ball more than once to determine additional random numbers for the interim bingo game of the active bingo session. It should be appreciated that one or more random numbers can be determined for the interim bingo game of the active bingo session in other suitable ways. In some implementations, once the center device 410 has generated one or more random numbers for the ball draw at block 460, the center device 410 may transmit a message to the bingo game engine 415 indicating the outcome of the ball draw. In some implementations, center device 410 may also transmit a message to the EPI 405 (as well as other associated EPIs) indicating the outcome of the ball draw.

In some implementations, as illustrated at block 465, the message received from the center device 410 indicating that a ball draw occurred, may trigger the EPI 405 to transmit the player's wager(s) to the bingo game engine 415. It should be appreciated that in some implementations, if the EPI 405 does not receive any player wagers, block 465 does not occur. In some implementations, the bingo game engine 415 does not receive player wagers from any EPIs associated with the active bingo session allotted to the center device 410, one of more of the blocks, such as blocks 465-block 490, may not occur.

In some implementations, as illustrated at block 470, bingo game engine 415 may transmit a request that the bingo session manager 420 generate custom bingo cards based on the player's wagers. In some implementations, the request for custom bingo cards may include information such as, but not limited to, session ID for the active bingo session and/or center device ID (e.g., an ID for center device 410). In some implementations, the request for custom bingo cards may include information such as, but not limited to, the player's one or more wagers.

Figure 6D:
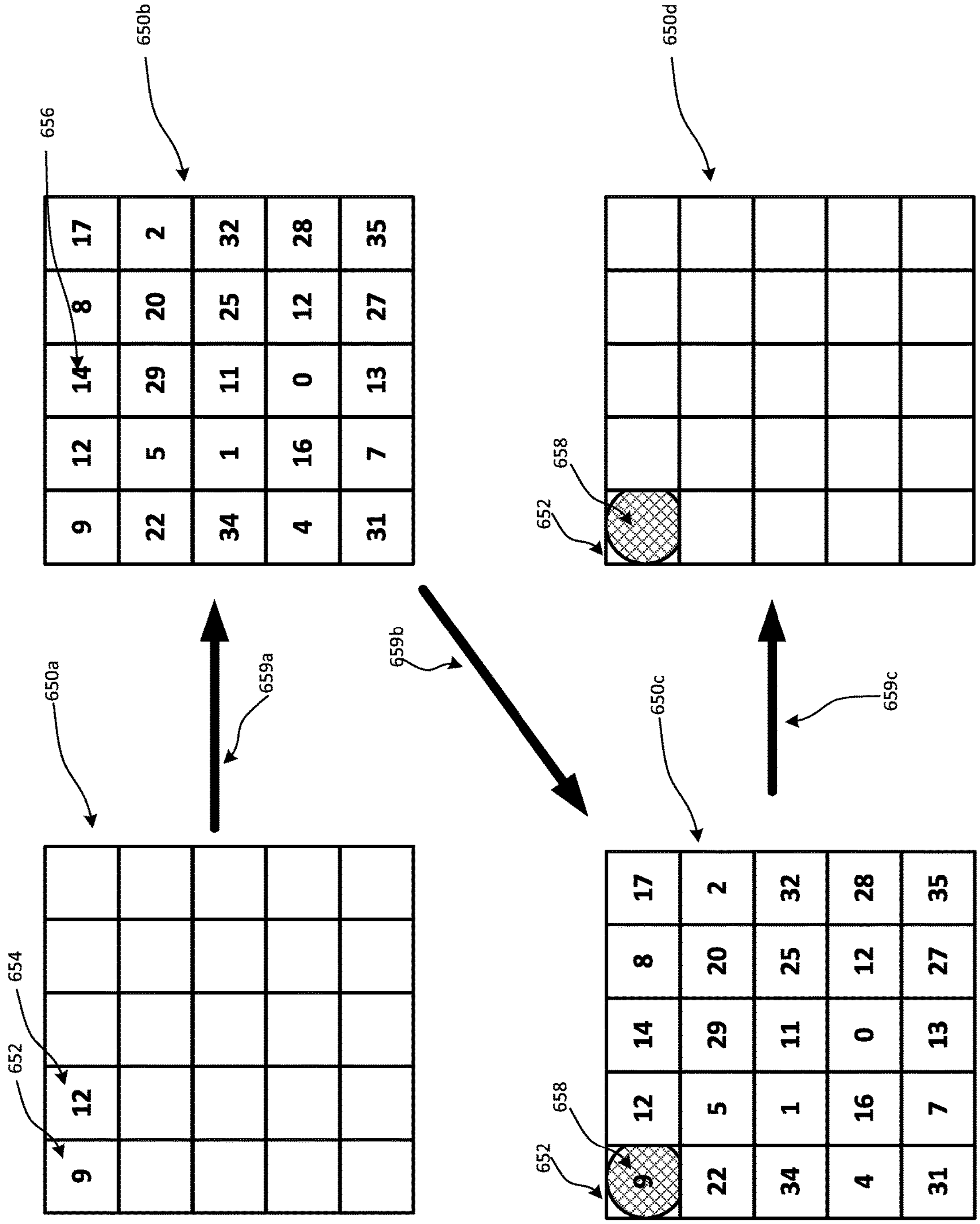
FIG. 6D is an illustration of a bingo server creating customize bingo cards based on player selections that can be used in connection with some systems and methods, according to some implementations of the present disclosure.

As illustrated at block 475, upon receiving the request to generate custom bingo cards from the bingo game engine 415, in some implementations the bingo session manager 420 may generate custom bingo cards. FIG. 6D illustrates some implementations of the bingo session manager 420 generating custom bingo cards for a player. In some implementations, the custom bingo cards are based on the one or more player wagers. Using the example from FIG. 6B, in some implementations, if the player selected a Split Bet wager of "9" and "12" on the roulette table interface 615, the bingo session manager 420 may generate a custom bingo card for the player using the numbers "9" and "12." In some implementations, the bingo session manager 420 places the numbers "9" and "12" in a predetermined location in a custom bingo card. As shown in FIG. 6D, the bingo session manager 420 may place the numbers "9" and "12" in the top left hand corner in predetermined space 652 and predetermined space 654. In alternative implementations, the predetermined spaces in the custom bingo card can be located elsewhere on the custom bingo card. In some implementations, the predetermined locations can be in the middle of the bingo card, or some other suitable location.

As bingo cards generally have a plurality of places for additional numbers (See, e.g., the bingo card 650*a* in FIG. 6D with a plurality of unfilled/empty spaces in the bingo card 650), the bingo session manager 420 may need to add additional numbers to the custom bingo card. For example, for one or more empty additional spaces in the bingo card 650*a* that do not have a number, the bingo session manager 420 may randomly generate numbers to use in one or more of the empty additional spaces. The transition arrow 659*a* points to the bingo card 650*b* that has been transformed with additional randomly generated numbers by bingo session manager 420. For example, space 656 to the right of the "12" now has the number "14". The bingo session manager 420 has also added randomly generated numbers to the other previously empty spaces for the custom bingo card. It should be appreciated that the quantity of spaces and numbers used for the custom bingo cards can vary in different implementations. In some implementations, the quantity of spaces and numbers used for custom bingo cards can increase or decrease over the those that are illustrated in FIG. 6D. In some implementations, the custom bingo cards, as will be explained below, can be used to determine whether a player has winning player wagers. It should be appreciated that in addition to providing the player with the opportunity to influence at least some of the numbers used in a custom bingo card, the above process is a technological improvement over prior bingo systems. In prior bingo systems, all of the numbers used in the bingo cards were randomly generated. As it should be apparent from implementations that use player selected numbers, the custom bingo cards generated by the bingo session manager 420 do not require as much processing power to create the custom bingo cards as with traditional bingo card generation. This is a result of the player selecting one or more of the numbers used for the bingo cards. The player selections enable the bingo session manager 420 to make less calls to an RNG and/or a processor to create the custom bingo cards. This means less processor usage and less memory used to create custom bingo cards. In some bets in a roulette-based bingo game, a large majority of the numbers used to populate a custom bingo card are derived from the player's wager selection (e.g., and Even Bet). This translates into even fewer calls to an RNG and/or a processor by the bingo session manager 420, further increasing the efficiency of the improved bingo system. It should be appreciated that this processing improvement will see larger gains as more custom bingo cards are generated over many 1000s of plays of interim bingo games.

In some implementations, as part of the customer bingo card generation, the bingo session manager 420 may evaluate the generated custom bingo card to determine if the numbers on the custom bingo card are unique for the bingo game (e.g., the bingo game cycle). In some implementations, this evaluation for unique bingo cards may include determining if the numbers are the same between custom bingo cards used during the bingo game cycle. In some implementations, the bingo session manager 420 may determine that custom bingo cards with the same number, but in a different arrangement on the custom bingo card are considered unique. In some implementations, where the bingo session manager 420 determines that a generated custom bingo card is not unique, the bingo session manager 420 may rearrange the randomly generated numbers (numbers not derived from the player's wager) on the bingo card and evaluate the bingo card again for uniqueness. In some implementations, the bingo session manager 420 may replace one or more of the randomly generated numbers on the bingo card with new randomly generated numbers and evaluate the bingo card again for uniqueness. It should be appreciated that the custom bingo card can be altered in any suitable way to obtain a unique custom bingo card for the bingo game cycle.

In some implementations, the bingo session manager 420 may generate a separate bingo card for different wagers. In some implementations, using the bingo-based roulette game for an example, if the player placed wagers in addition to the Split Bet mentioned above, the bingo session manager 420 may generate one or more additional bingo cards for the additional wagers. For example, if the player placed a Straight Bet, the bingo session manager 420 may have generated a custom bingo card for the Straight Bet. Continuing with that example, if the player also placed a Corner Bet, the bingo session manager 420 may additionally generate a custom bingo card for the Corner Bet. That is, a Straight Bet, Corner Bet, and a Split Bet may be placed on three different custom bingo cards for the player in an interim bingo game.

In some implementations, one or more wagers can be added to the same custom bingo card. Using the bingo-based roulette example, in some implementations, wagers for a Straight Bet and a Corner Bet can be added to a same custom bingo card. For example, if a player's selected wager for the Straight Bet is "9" and a player selected wager for the Corner Bet is "11", "12", "14", and "15", the bingo session manager 420 may place the player's selected wagers into different predetermined spaces in a custom bingo card. For example, in some implementations, a Straight Bet's predetermined space can be space 715 in FIG. 7 while the Corner Bet's predetermined spaces can be spaces 745 in FIG. 7 on a same custom bingo card. As discussed above, the predetermined spaces can be selected anywhere in a custom bingo card for the player's wagers.

In some implementations, different wagers in a bingo-based game can be associated with different classifications or states in the improved bingo system. In some implementations, these different classifications or states for wagers translates into different wagers in the bingo-based game being associated with different bingo patterns. Another way to view the different classifications or states is mapping different types of wagers in a first type of game with different types of wagers in a second type of game. That is, if a first type of game is roulette, one or more traditional roulette type wagers can be mapped to different types of bingo game wagers (e.g., different bingo card patterns). In some implementations, different roulette game wagers can be mapped to different bingo patterns. As is further explained below, in some implementations, the mapping can be used for different applications in the improved bingo system.

Figure 7:
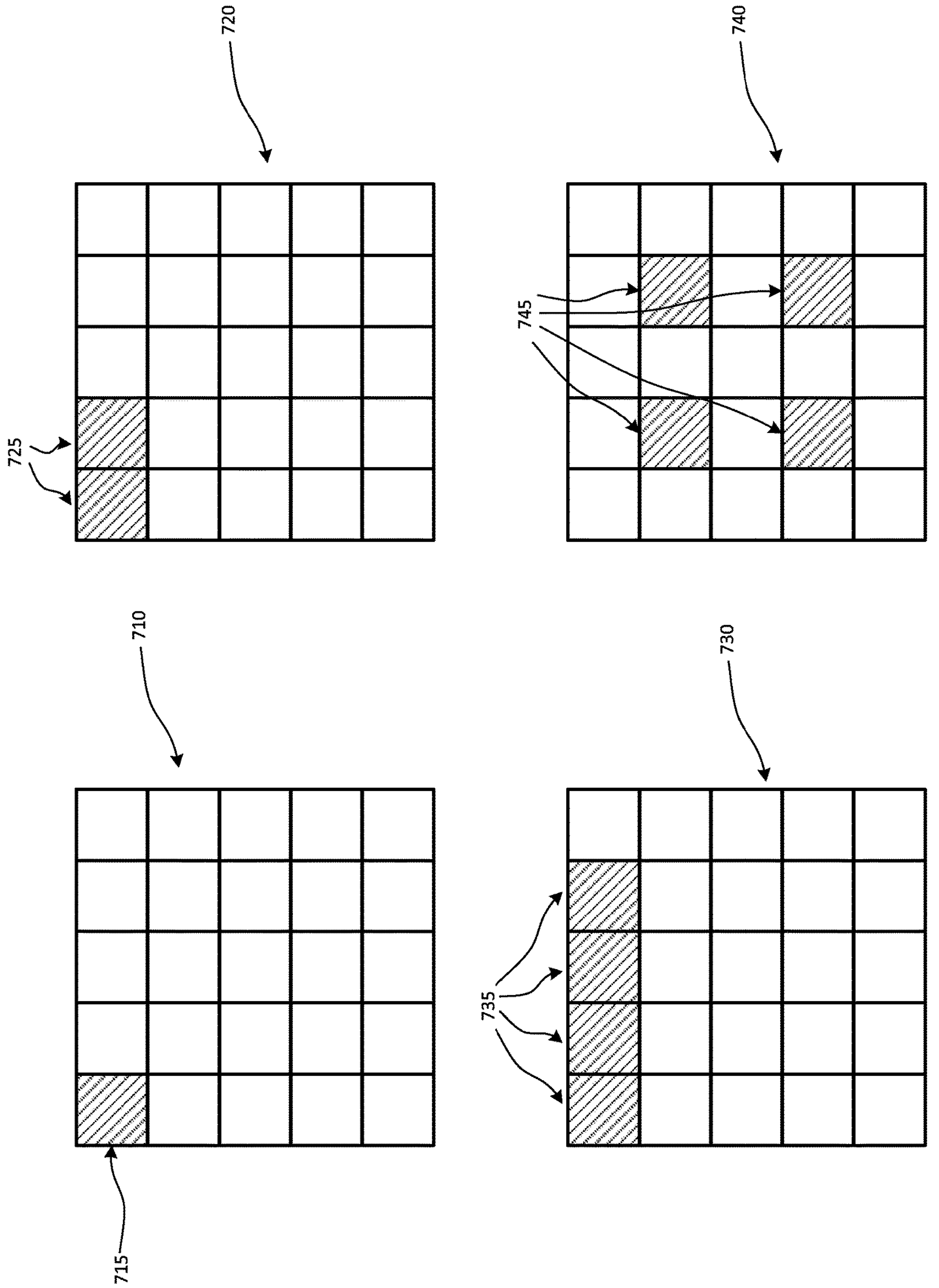
FIG. 7 is an illustration of some different bingo interim prize patterns that can be associated with different types of customized player wagers.

One application of the mapping between the first type of game and the second type of game is illustrated in how a player's wagers can be represented in the custom created bingo cards. For example, a Corner Bet wager in a roulette game can be mapped to a pattern such as shown in bingo card 730 in FIG. 7. In some implementations, the pattern shown in bingo card 730 may define the predetermined spaces where numbers from the player's wager are placed in a custom bingo card. As an example, if a player placed a Corner Bet wager on "2", "3", "5", and "6", the bingo session manager 420 may place these numbers in the predetermined spaces defined by the spaces 735 when generating a custom bingo card for this wager. FIG. 7 illustrates some additional examples predetermined spaces that can be designated for different wagers in various implementations. Bingo card 710 represents a predetermined space 715 to place a player's Straight Bet wager (a player's wager on a single number) in a custom bingo card in some implementations. Bingo card 720 represents predetermined spaces 725 to place a player's Split Bet wager (a player's wager on two adjacent numbers) in a custom bingo card in some implementations. Bingo card 740 represents an alternative set of predetermined spaces 745 to place a player's Corner Bet wager (a player's wager on four adjacent numbers) in a custom bingo card in some implementations to illustrate that different predetermined spots in a bingo card can be used for the same wager. In some implementations, the mapping in certain roulette bets having a large quantity of numbers (e.g., Red, Black, Odd, Even, Dozens, etc.) may cause the bingo session manager 420 to randomly distribute the numbers in a generated custom bingo card in predetermined spaces associated with these wagers. This randomized distribution of numbers for such wagers can help create unique custom bingo cards during a bingo game (e.g., during the one or more interim bingo games that can be played during the bingo game) to minimize having the same bingo card used more than once during a bingo game cycle. Is should also be appreciated that the present disclosure refers to a small fraction of bets that can be made in a bingo-based roulette game and that the improved bingo system may include one or more other types of wagers beyond what is discussed herein. Moreover, as noted above, different bingo-based games can use different predetermined spots for creating custom bingo cards based on a player's wager.

In some implementations, the predetermined spots to create a custom bingo card for different wagers can be randomly determined to create the predetermined patterns, such as the predetermined patterns shown in FIG. 7. For example, in some implementations, the predetermined space 715 in bingo card 710 can be randomly assigned to a different spot in bingo card 710 than is displayed in FIG. 7. In some implementations, this may cause center device 410 to create a custom bingo card for a Straight Bet to use the randomly determine spot to place a player's Straight Bet wager number when creating the custom bingo card. As will be discussed below, in some implementations, this alternative pattern that was randomly generated for bingo card 710 will also be used in the evaluation of a pattern created by a custom bingo card created for a player.

Another application of the mapping between the first type of game and the second type of game can be illustrated in how bingo card patterns are used to evaluate the generated custom bingo cards for wins. For example, a custom bingo card that is generated based on a Corner Bet wager may be evaluated against a Corner Bet bingo pattern. As another example, a custom bingo card that is based on a Split Bet wager may be evaluated against a Split Bet bingo pattern. In contrast, in some implementations, a custom bingo card created based on a Corner Bet bingo pattern is not evaluated against a Split Bet bingo pattern. The evaluation between a custom bingo card and a predetermined bingo pattern will be further described below in the discussion of FIG. 6D and FIG. 6F.

Returning to FIG. 4, as illustrated at block 480, in some implementations, the bingo session manager 420 may mark (e.g., daub) the generated custom bingo cards based on the numbers determined in the ball draw from block 460 (or some other suitable RNG mechanism). FIG. 6D illustrates an example of bingo session manager 420 marking the player's custom bingo card based on the ball draw from FIG. 6C. Recalling from FIG. 6C, the randomly generated number from the ball draw was "9." In some implementations, the bingo session manager 420 evaluates the custom bingo card for a "9". Transition arrow 695*b* points to an example custom bingo card that has been marked according to the ball draw. As shown in the custom bingo card 650*c*, the bingo session manager 420 determined that a "9" appeared in one of the spots (e.g., predetermined space 652) of the custom bingo card 650*c*. As such, the bingo session manager 420 marked (e.g., daubed) the custom bingo card 650*c* at predetermined space 652 as shown by mark 658 partially obscuring the "9". Since this bingo game in this example uses a single ball draw to determine outcomes, no further spots are marked on the custom bingo card. It should be appreciated that if the "9" did not appear in the custom bingo card, no spots would be marked on the custom bingo card 650*c*. In some implementations, if multiple balls are drawn for an interim bingo game, one or more spots on the bingo card could be marked if the numbers corresponding to the ball draws appeared in the custom bingo card.

In some implementations, as shown in block 482, the bingo session manager 420 may determine whether the custom bingo card resulted in a bingo game terminating event. In some implementations, the bingo game terminating event is a ball draw of a particular number that occurs over two consecutive interim bingo games such as "00" and "00" appearing on different custom bingo cards in consecutive interim bingo games for a player. For example, if a first interim bingo game resulted in a ball draw of "00" and second consecutive interim bingo game resulted in a ball draw of "00" and the "00" appeared on a first custom bingo card for a player in a first interim bingo game and the "00" also appeared in a second custom bingo card for the player in a second interim bingo game that is consecutive to the first interim bingo game, the bingo session manager 420 may determine that a bingo game terminating event occurred to end the bingo game (e.g., end the bingo game cycle). It should be appreciated that other suitable numbers, patterns, and/or sequences can be used to determine a bingo game terminating event. As an example, in some implementations, the bingo game terminating event can be designated as "000" ball draws in three consecutive interim bingo games. In some implementations, the bingo game terminating event can be designated as a "0" and a "000" ball draw in two consecutive interim bingo games. In some implementations, as noted above, the bingo game terminating event is also known as a game winning pattern.

In some implementations, the game winning pattern may result in a player with game winning pattern winning an additional prize. In some implementations, the prize for the game winning pattern is nominal, such as 1 cent. In some implementations, the prize for the game winning pattern can be more than nominal (e.g., $1, $10, etc.). In some implementations, multiple players may have custom bingo cards with the game winning pattern in the same active bingo session (e.g., same interim bingo game). In some implementations, one or more players with the game winning pattern will obtain the prize. In some implementations, the first player of multiple players with the game winning pattern in a same active bingo session that transmits their wager to the bingo game engine 415 may be determined the winner of the prize for the game winning pattern. It should be appreciated that the bingo game terminating event is a technological improvement over prior bingo game systems because it improves performance of the improved bingo system. To terminate a bingo game in prior bingo systems, these prior bingo systems used a game winning pattern (or game ending pattern) of a completely covered bingo card. When a new bingo game was started in prior bingo systems, a persistent bingo card would be created to mark/daub ball draws that match numbers on the persistent bingo card over multiple interim bingo games. When the persistent bingo card was completely covered (e.g., all spots on were marked/daubed), the prior bingo systems would determine that a game winning pattern occurred to end the game. The prior bingo systems required substantially more processing and memory for this activity than the improved bingo system disclosed herein. For example, the prior bingo systems used multiple ball draws for each interim bingo game, causing more processing to generate the ball draws (e.g., random numbers). Moreover, the prior bingo systems stored and tracked a persistent bingo card over all plays of interim bingo games during a bingo game cycle. In contrast, the improved bingo system disclosed herein uses less processing power and memory because ball draws and bingo cards are not stored over all of the interim bingo games of a bingo game cycle in some implementations.

Figure 6E:
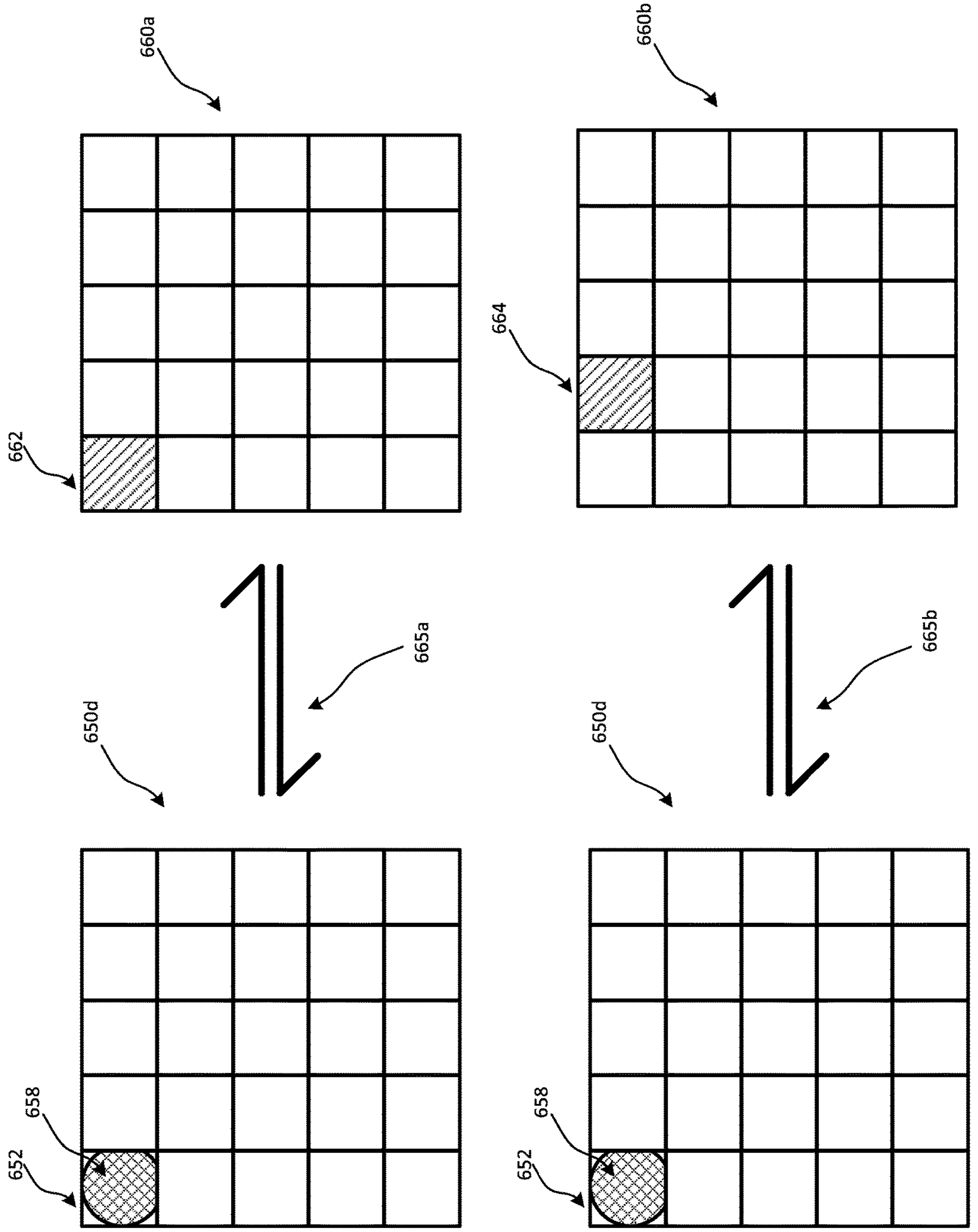
FIG. 6E is an illustration of a bingo server evaluating customized bingo cards against predetermined interim prize patterns that can be used in connection with some systems and methods, according to some implementations of the present disclosure.

As illustrated at block 485, and some implementations, the bingo game engine 415 evaluates the custom bingo cards against predetermined bingo card patterns (e.g., one or more of the example predetermined bingo card patterns shown in FIG. 7) to determine winning player wagers. In some implementations, the ball draw number(s) and the numbers derived from the player's wagers are not used to directly determine wining player wagers. Rather, in some implementations, the evaluation of the custom bingo cards is based on evaluating patterns created from marking the custom bingo cards against predetermined patterns associated with the type of wager used to create the custom bingo cards. An example illustration of this process is shown in FIG. 6D and FIG. 6E. In FIG. 6D, transitional arrow 659*c* points to custom bingo card 650*d* that extracts the pattern created by marking predetermined space 652 with mark 658 in some implementations. It should be appreciated that in some implementations, a custom bingo card 650*d* does not need to separate the numbers from custom bingo card 650*c* for the evaluation purposes.

Turning to FIG. 6E, the bingo game engine 415 may evaluate the pattern on the custom bingo card 650*d* against a predetermined bingo card pattern that is associated with the wager that was used to create the custom bingo card 650*d*. Recalling from the example in FIG. 6B, the player placed a Split Bet wager. In this example, a Split Bet wager for a bingo-based roulette game is mapped to a Split Bet predetermined bingo card pattern (e.g., bingo card 720). In some implementations, predetermined bingo card patterns with more than one marked spot (e.g., bingo card 720, bingo card 730, bingo card 740, etc.) can be split or divided into multiple predetermined wager patterns. For example, in some implementations, the Split Bet predetermined bingo card pattern from bingo card 720 can be divided out into separate predetermined split bet bingo card patterns as represented as the predetermined bingo card patterns in bingo card 660*a* and bingo card 660*b* in FIG. 6E. Predetermined space 662 and predetermined space 664 are marked in the respective bingo card 660*a* and bingo card 660*b* and may correspond respectively to predetermined spaces 725 in bingo card 720 in FIG. 7. As can be seen, the combination of the bingo card 660*a* and the bingo card 660*b* form the predetermined bingo card pattern associated with a Split Bet wager (e.g., as shown in the example bingo card 720 in FIG. 7). In implementations that use a single ball (or a single randomly generated number) to create the player's custom bingo card pattern 650*d*, the Split Bet pattern in bingo card 720 can be separated in to one or more predetermined bingo card patterns (e.g., bingo card 660*a* and bingo card 660*b*) for evaluation purposes (e.g., because the pattern created on the player's custom bingo card is a single spot). Thus, in some implementations, the player's custom bingo card 650*d* can be evaluated against the bingo card 660*a* as well as bingo card 660*b* to determine if the pattern from the player's custom bingo card matches at least one of the predetermined bingo card patterns in bingo card 660*a* and bingo card 660*b*. In some implementations, if a match is formed from one of the divided predetermined bingo patterns, the player's wager can be determined to be a winning wager. In this example shown in FIG. 6E, the pattern in the player's custom bingo card 650*d* matches with the pattern in the bingo card 660*a* (e.g., both bingo cards have a marked spot in the top left hand corner). Because the bingo game engine 415 determined that at least one predetermined bingo card pattern is a match, the player's wager can be determined to be a winning player wager. It should be appreciated that in some implementations, the predetermined bingo card patterns (e.g., the predetermined bingo card patterns in FIG. 7) do not need to be split into separate predetermined bingo card patterns for evaluation purposes. That is, in some implementations, the bingo game engine 415 can evaluate a player's marked custom bingo card and compare it against one or more predetermined marked spaces in an undivided predetermined bingo card pattern that is associated with the player's wager. It should be appreciated that in some implementations, if bingo game engine 415 did not determine a pattern match between bingo cards in FIG. 6E, then the player's wager would not be determined to be a winning wager.

It should also be appreciated that using a pattern from one spot in a bingo card to determine a winning player wager is a technological improvement over prior bingo systems. In prior bingo systems, a player's bingo card would be evaluated using multiple spots in on the player's bingo card because the player's bingo card would need multiple marked spots to create a winning matching pattern. In contrast, in some implementations where the improved bingo system uses one spot to create a matching pattern, the bingo game engine 415 requires less processing and memory to determine the match. That is, in some implementations, the bingo game engine 415 may limit its evaluation of a player's custom bingo card to one marked spot, reducing the scope of an evaluation of a player's custom bingo card. In some implementations, once a spot between the player's custom bingo card (e.g., 650*d*) is determined to match against a spot in bingo card with a predetermined pattern (e.g., bingo card 660), the bingo game engine 415 may skip evaluating further spots in the bingo cards.

As illustrated at block 486, in some implementations the bingo game engine 415 may transmit the outcome of its evaluation as well as the data received from the bingo session manager 420 to the EPI 405. In some implementations, the bingo game engine 415 may transmit a message to the EPI 405 that includes, but is not limited to, information regarding ball draw outcome, marked custom bingo cards based on player wagers, whether a game ending pattern was determined from the custom bingo cards, and whether the player obtain any winning wagers from their custom bingo card(s). While not shown, in some implementations, the bingo session manager 420 may alternatively evaluate the generated custom bingo cards for winning player wagers in place of the bingo game engine 415.

Figure 6F:
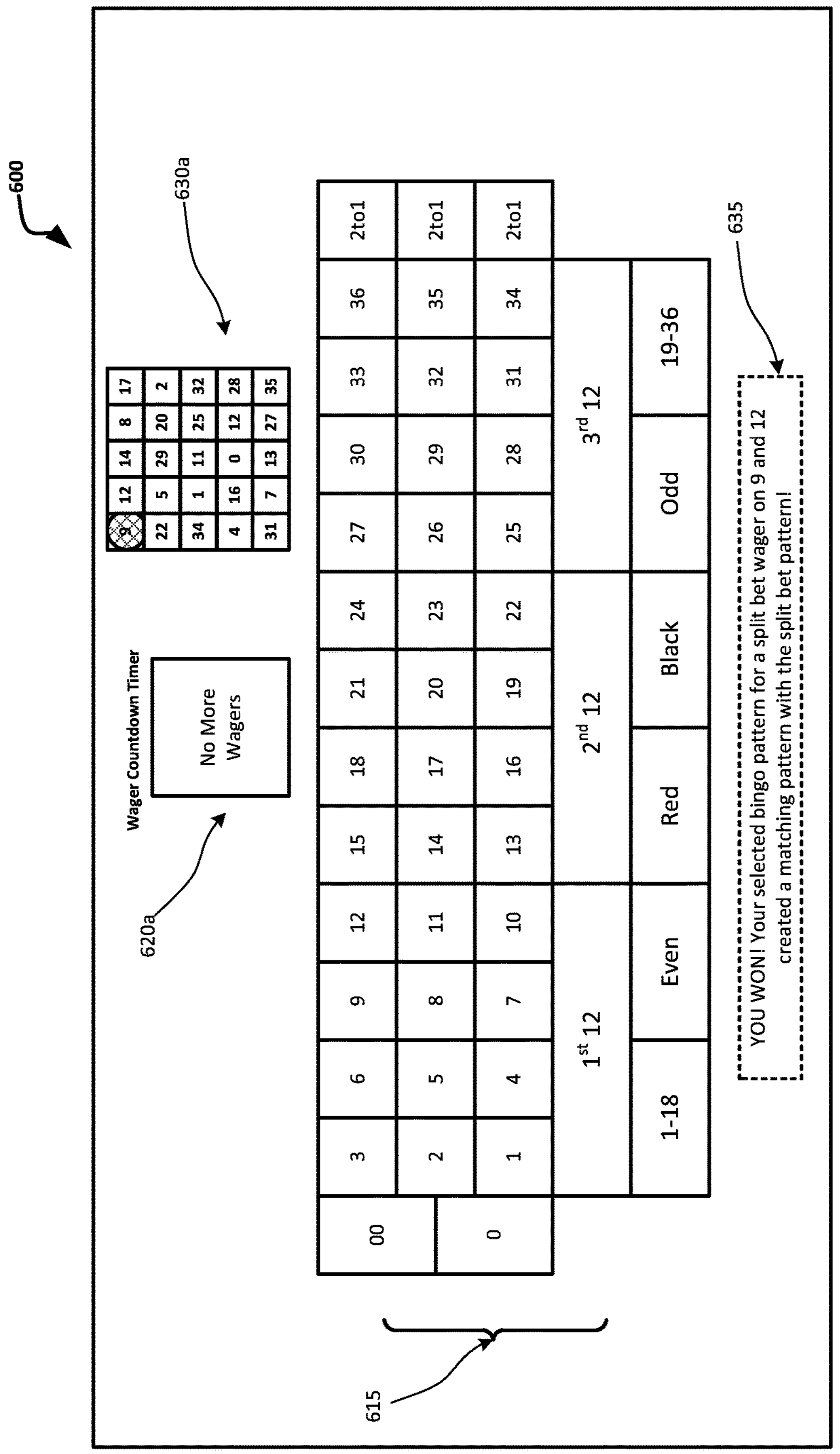
FIG. 6F is an illustration of a roulette user interface that can be used in connection with some systems and methods, according to some implementations of the present disclosure.

As shown in block 487, and some implementations, once the EPI 405 receives a message from bingo game engine 415 regarding the ball draw outcome, the marked custom bingo cards based on player wagers, and winning player wagers, the EPI 405 may display such information to the player. An example of the information display is shown in game screen 600 of FIG. 6F. In FIG. 6F, the message window 635 was updated to state: "YOU WON! Your selected bingo pattern for a split bet wager on 9 and 12 created a matching pattern with the split bet pattern!" It should be appreciated that any suitable message can be displayed. In some implementations, no message is displayed and the game screen may indicate winning wagers in other suitable ways. FIG. 6F also shows an updated bingo board 630*a* that reflects the marked up custom bingo card created for player based on the player's Split Bet wager. In some implementations, the EPI may cause the player's winnings to be provided to the player in any suitable manner (e.g., increasing the player's credit meter, dispending a voucher ticket with the player's winnings, etc.). In some implementations, as shown in block 488, the EPI 405 may transmit a message to the bingo game engine 415 requesting that the bingo game engine 415 confirm that the interim bingo game of the active bingo session is complete. As shown at block 490, in some implementations, the bingo game engine 415 may transmit confirmation message to the EPI 405 that the interim bingo game of the active bingo session is complete. As also shown at block 490, in some implementations, the bingo game engine 415 may transmit confirmation message to the bingo session manager 420 that the interim bingo game of the active bingo session is complete. In some implementations, the center device 410 and EPI 405 may return to waiting for one or more next player wagers for either a next interim bingo game or for two or more players to start a new bingo game. In some implementations, the center device 410 automatically return to block 430 and restart the disclosed process after an interim bingo game is completed.

It should be appreciated that process 400 may include more or fewer steps in various implementations. In some implementations, the steps can be arranged in different order than shown or described herein.

Figure 5A:
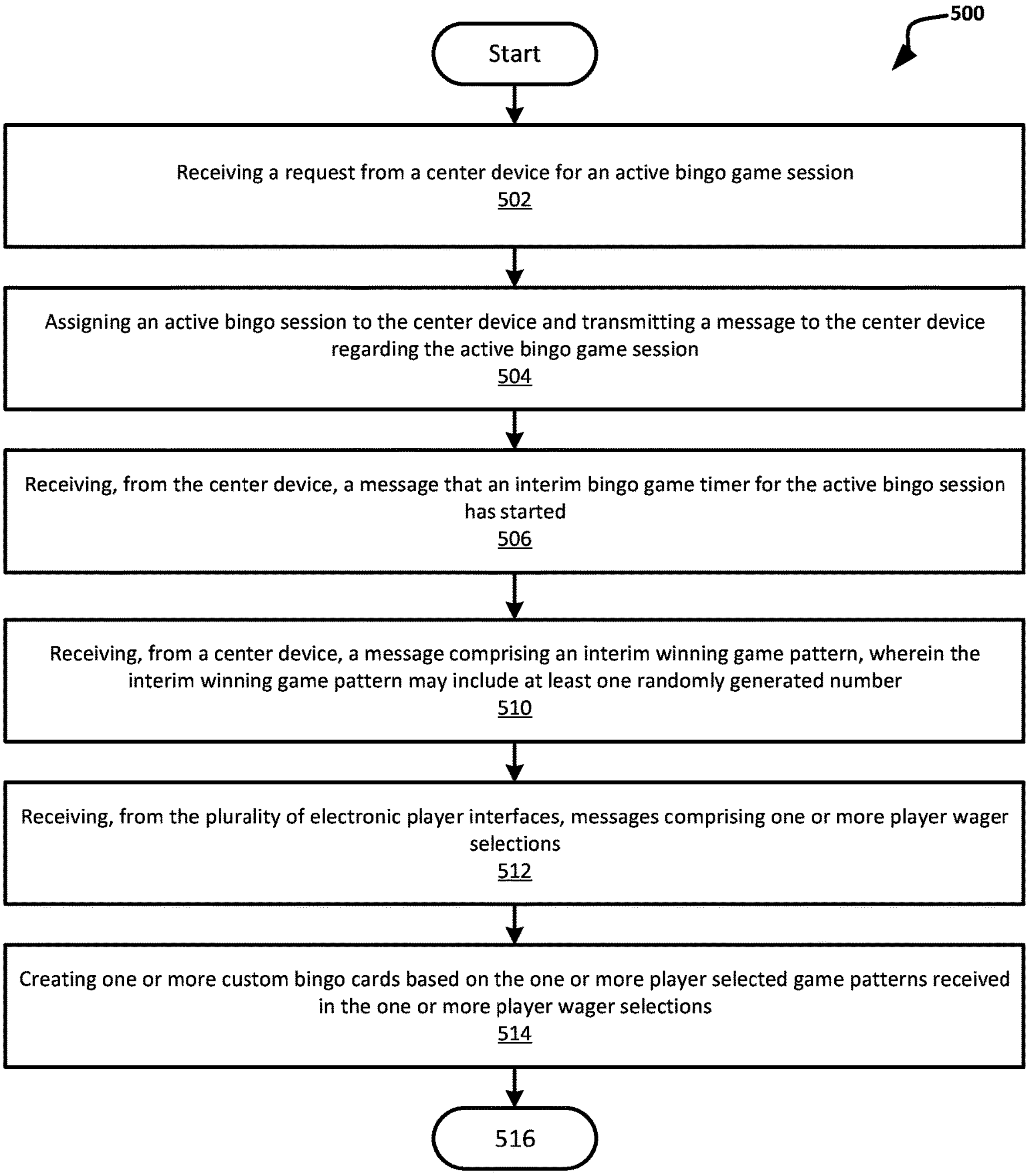
FIG. 5A, FIG. 5B, and FIG. 5C are flowcharts that describe a method of operating a gaming server, according to some implementations of the present disclosure.
Figure 5B:
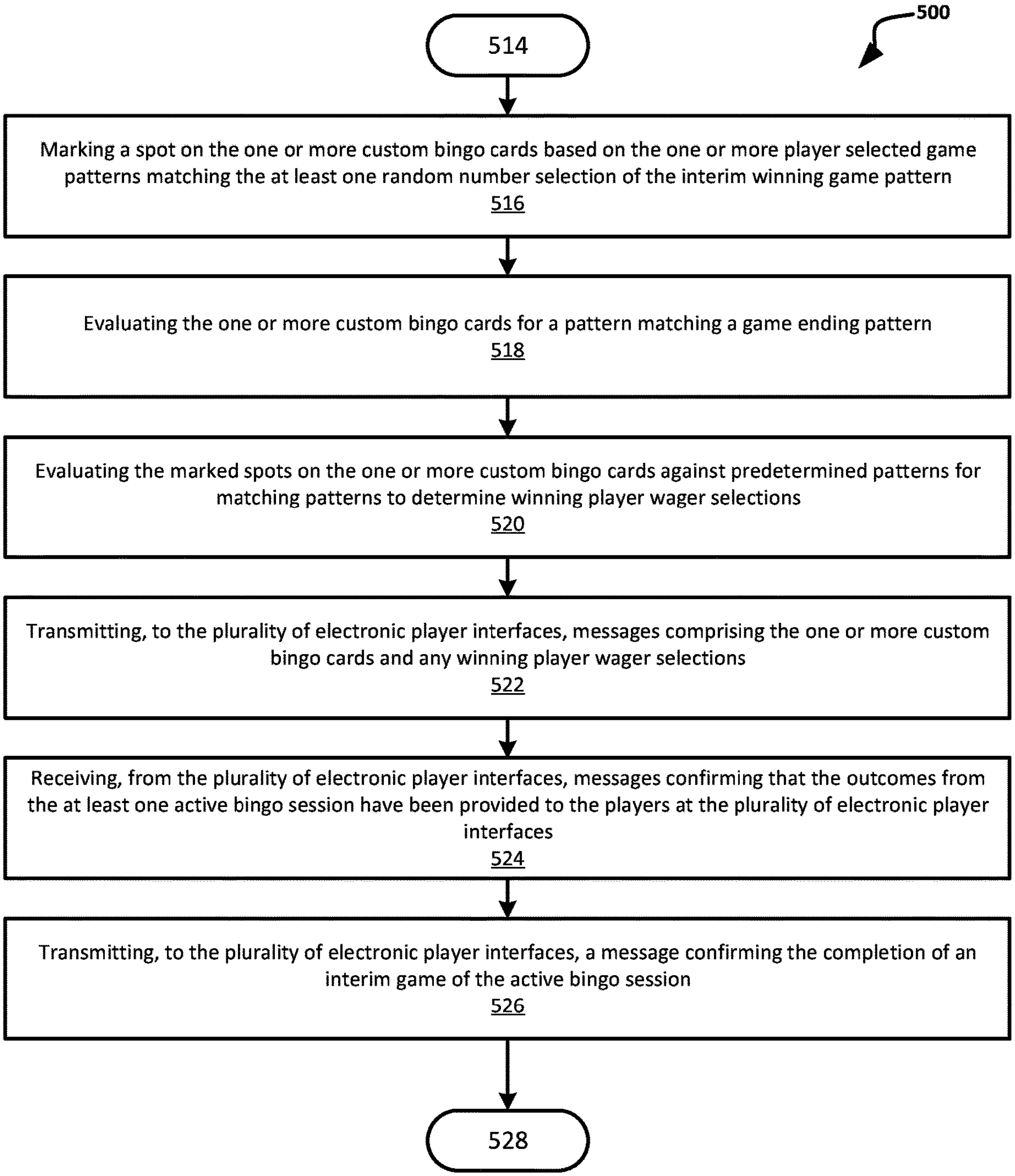
Figure 5C:
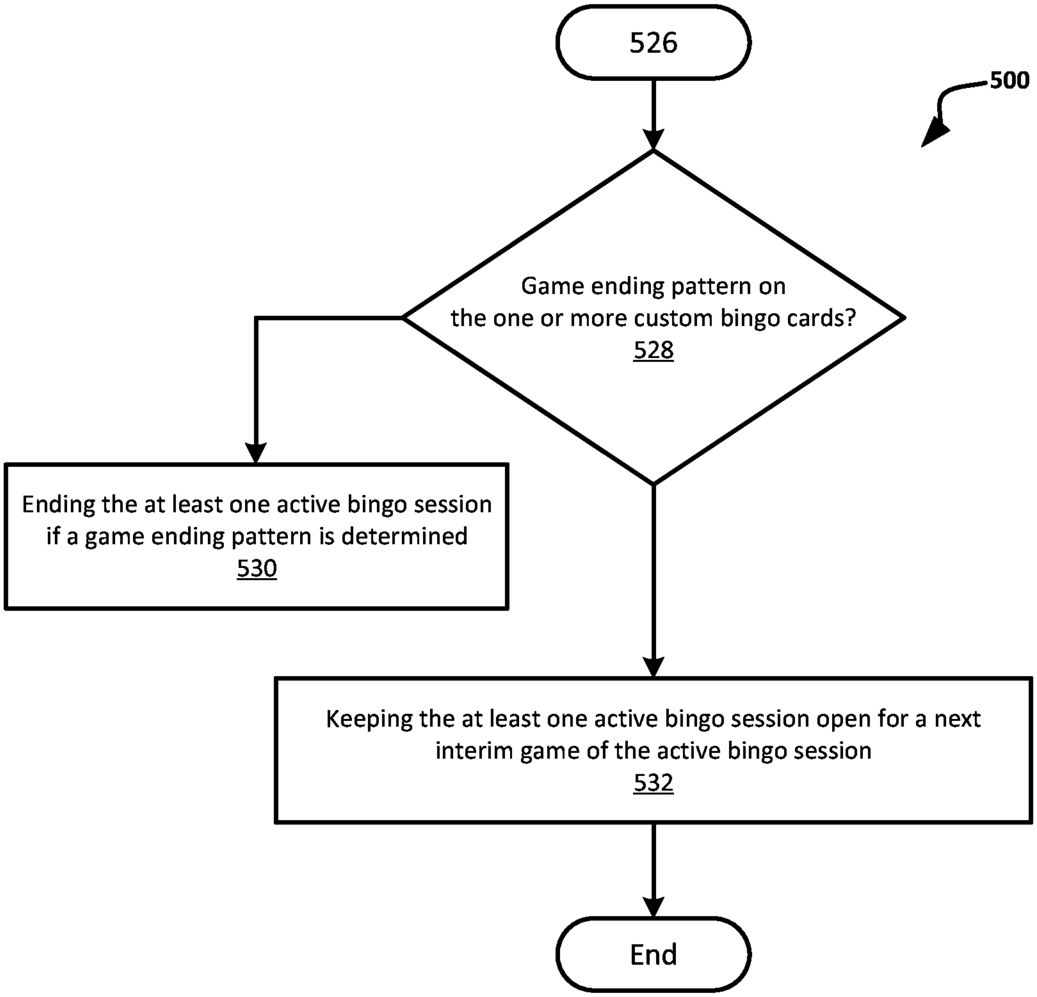

FIG. 5A, FIG. 5B, and FIG. 5C are flowcharts that describe a method of operating a gaming server, according to some implementations of the present disclosure. The process 500 in FIG. 5A, FIG. 5B, and FIG. 5C describe a bingo system that is the same or similar to the process described in connection with FIG. 4 and FIG. 6A-FIG. 6F. While FIG. 4 generally described the operation of one EPI working within the bingo system (for explanation purposes), FIG. 5A, FIG. 5B, and FIG. 5C illustrate the method operating with a plurality of EPIs from the perspective of a bingo server such as bingo server 130, according to some implementations.

In some implementations, at 502, the method may include the bingo server receiving a request from a center device for an active bingo session. In some implementations, a center device 110 may send the request to the bingo server 130. In some implementations, a bingo server may receive similar requests from one or more center devices (e.g., such as one or more center devices shown in FIG. 2). As noted in FIG. 4, the request from a center device may first be sent to a bingo game engine in the bingo server 130 in some implementations. In some implementations, the request may be forwarded to a bingo session manager in the bingo server 130 in some implementations.

At 504, the method may include the bingo server assigning an active bingo session to the center device. In some implementations, as shown at 504, the method may also include the bingo server transmitting a message to the center device regarding the active bingo game session. If an active bingo game session is available, the center device making the request may be assigned to the active bingo game session. In some implementations, the bingo server may lock the assigned bingo game session so that the active bingo games session is not assigned again until the interim bingo game is complete (and a game ending pattern was not obtained during the active bingo game session). In some implementations, where no active bingo game session is available, the bingo server may create a new bingo game if a quorum of players is available (e.g., at least two players are attempting to play a bingo game). As noted above, in some implementations, where no active bingo sessions are available, at least two players may be needed to start a new bingo game to comply with class II bingo gaming regulations. In some implementations, if no active bingo game session is available and a quorum of players is not available, the bingo server may inform the center device to wait for a quorum of players at EPIs. In some implementations, the center device and/or the bingo server may also alert one or more EPIs associated with the center device that the system is waiting for at least one additional bingo player to start a new bingo game.

At 506, the method may include the bingo server receiving, from the center device, a message that an interim bingo game timer for the active bingo session has started. An example implementation is shown at block 445 in FIG. 4.

At 510, the method may include the bingo server receiving, from a center device, a message comprising an interim winning game pattern that includes a randomly generated number from an RNG. In some implementations, the interim winning game pattern is a ball draw in a bingo-based game. As noted above, the random number generator may be associated with a center device, such as center device 110 or center device 410. These center devices may have an RNG, such as a hardware RNG or software RNG to produce the at least one randomly generated number for a bingo game or interim bingo game. In some implementations, 510 may come from an RNG not associated with a center device. In some implementations, bingo server 130 may include an RNG to generate random numbers that can be used to create the interim winning game pattern. An example implementation of this is shown at block 460 of FIG. 4.

At 512, the method may include the bingo server receiving, from the plurality of electronic player interfaces, messages comprising one or more player wager selections. In some implementations, as noted in FIG. 4, the center device may alert the EPIs that interim winning game pattern has been drawn or selected. This may trigger the EPIs to send any collected player wagers to the bingo server, as noted in 512.

In some implementations, at 514, the method may include the bingo server creating one or more custom bingo cards based on the one or more player selected game patterns received in the one or more player wager selections. In some implementations, creating one or more custom bingo cards can be done in accordance with the process described in connection with FIG. 4. As noted in FIG. 4, in some implementations, one unique aspect to generating the custom bingo cards is that the player is permitted to select numbers that will be used to generate the custom bingo cards and the pattern that will be used to evaluate the generated custom bingo cards.

FIG. 5B is a flowchart extending from FIG. 5A and further illustrating the method of operating a gaming server, according to some implementations of the present disclosure. At 516, the method may include the bingo server evaluating the one or more custom bingo cards for a pattern matching the interim winning game pattern generated at 510. In some implementations, the evaluation at 516 may also include the bingo server marking one or more spots on the one or more custom bingo cards based on the interim winning game pattern. For example, as shown in FIG. 6D, bingo card 650*c* was marked/daubed to match the interim winning game pattern (e.g., the RNG selection of a "9"/ball draw resulting in "9"). An example implementation of the evaluation and marking process is described in connection with FIG. 4 and FIG. 6D.

In some implementations, as shown at 518, the method may include the bingo server evaluating the one or more custom bingo cards for a pattern matching a game ending pattern. An example implementation of the evaluation for a game ending pattern is described in connection with FIG. 4 at block 482.

In some implementations, at 520, the method may include the bingo server evaluating the marked spots on the one or more custom bingo cards against predetermined patterns for matches to determine winning player wager selections. An example implementation of this evaluation process is described in connection with FIG. 4, FIG. 6D, and FIG. 6E.

At 522, the method may include the bingo server transmitting, to the plurality of electronic player interfaces (e.g., EPIs), messages comprising the one or more custom bingo cards and any winning player wager selections. The messages may also include data on ball draw(s), game ending patterns, etc. An example implementation of this process is discussed in FIG. 4. In some implementations, data for the messages may be sent from the bingo server to the EPIs. As discussed in FIG. 4, different modules (e.g., the bingo session manager and the bingo game engine) of the bingo server may generate different portions of the data in the messages to the EPIs. In some implementations, where these modules are resident on the same device, the modules pass the messages between software applications. In some implementations, as noted above, the bingo session manager and the bingo game engine may be resident on separate devices and the messages may be sent via network communications between the various devices.

At 524, the method may include the bingo server receiving, from the plurality of electronic player interfaces, messages confirming that the outcomes from the at least one active bingo session have been provided to the players at the plurality of electronic player interfaces. In some implementations, the messages may include the EPIs requesting confirmation from the bingo server that the interim bingo game is complete. An example implementation of this process is described at block 487 in connection with FIG. 4.

In some implementations, at 526, the method may include the bingo server transmitting, to the plurality of electronic player interfaces, messages confirming the completion of an interim game of the active bingo session. An example implementation of this process is described at block 490 in connection with FIG. 4.

FIG. 5C is a flowchart extending from FIG. 5B and further illustrating the method of operating a gaming server from FIG. 5A, according to some implementations of the present disclosure. At 528, the method may include the bingo server determining whether the interim winning game pattern resulted in a termination of the at least one active bingo session (e.g., from a game ending pattern). At 530, the method may include ending the at least one active bingo session if the interim winning game pattern resulted in the termination.

At 532, the method may include the bingo server keeping the at least one active bingo session open for a next interim game of the active bingo session (e.g., continuing the bingo game cycle for the bingo game). In some implementations, the process may start again at block 502 with the bingo server receiving a request from a center device for an active bingo game session.

It should be appreciated that the improved bingo system disclosed herein provide a new bingo-based game. In some implementations, the improved bingo-based game enables players to use technological aids that mimic traditional casino games, such as roulette, and translates players' wagers in the technological aids into highly player customized bingo cards. Heretofore, players were unable to influence the selection and design of bingo cards. In the improved bingo-based game disclosed herein, players are enabled to create non-conventional, player influenced bingo cards during bingo games.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flow charts shown above may be used, with steps re-ordered, added, or removed. Accordingly, other implementations are within the scope of the following claims.

What is claimed:

1. A gaming server, comprising:

at least one processor; and at least one memory that stores computer executable instructions, wherein, when the computer executable instructions are executed by the at least one processor, the at least one processor is configured to:

receive, from a center device, a message comprising an interim winning game pattern, wherein the interim winning game pattern comprises at least one random number selection;

receive at least one message comprising one or more player wager selections from at least one electronic player interface, wherein the one or more player wager selections comprise one or more player selected game patterns;

create one or more custom bingo cards based on the one or more player selected game patterns received in the one or more player wager selections;

evaluate the one or more custom bingo cards for a pattern matching the interim winning game pattern;

evaluate the one or more custom bingo cards against predetermined patterns for matching patterns to determine winning player wager selections; and transmit, to the at least one electronic player interface, at least one message comprising the one or more custom bingo cards and the winning player wager selections.

2. The gaming server of claim 1, wherein one player wager selection of the one or more player wager selections is used to create one custom bingo card.

3. The gaming server of claim 1, wherein different player wager selections of the one or more player wager selections are used to create different custom bingo cards.

4. The gaming server of claim 1, wherein creating the one or more custom bingo cards further comprises adding the one or more player selected game patterns to predefined spots on the one or more custom bingo cards and filling in any unfilled spots on the one or more custom bingo cards with randomly generated numbers.

5. The gaming server of claim 4, wherein the predefined spots on the one or more custom bingo cards are selected based on a type of wager associated with one of the one or more player wager selections.

6. The gaming server of claim 1, wherein evaluating the one or more custom bingo cards for matching patterns further comprises: evaluating the one or more custom bingo cards against predetermined patterns that are determined based on classifications of individual player wager selections.

7. The gaming server of claim 1, wherein the interim winning game pattern is generated by a hardware based random number generator.

8. The gaming server of claim 7, wherein the hardware based random number generator comprises is a physical roulette wheel and a ball.

9. The gaming server of claim 1, wherein the interim winning game pattern is generated by a software based random number generator.

10. The gaming server of claim 1, wherein receiving the at least one message comprising the one or more player wager selections from the at least one electronic player interface occurs after receiving the message comprising the interim winning game pattern.

11. The gaming server of claim 1, wherein the one or more player selected game patterns are for a bingo game that is mapped to a technological aid formed as a big wheel game player interface.

12. The gaming server of claim 1, wherein the one or more player selected game patterns are for a bingo game that is mapped to a technological aid formed as a roulette style player interface.

13. The gaming server of claim 1, wherein the one or more player selected game patterns are for a bingo game that is mapped to a technological aid formed as a craps style player interface.

14. The gaming server of claim 1, wherein the computer executable instructions further cause the at least one processor to: receive a plurality of messages comprising one or more player wager selections from a plurality of different electronic player interfaces, wherein the one or more player wager selections comprise one or more player selected game patterns, and wherein the plurality of different electronic player interfaces are associated with different game centers.

15. A method of operating a gaming server, comprising:

receiving, from a center device, a message comprising an interim winning game pattern, wherein the interim winning game pattern comprises at least one random number selection;

receiving at least one message comprising one or more player wager selections from a at least one electronic player interface, wherein the one or more player wager selections comprise one or more player selected game patterns;

creating one or more custom bingo cards based on the one or more player selected game patterns received in the one or more player wager selections;

evaluating the one or more custom bingo cards for a pattern matching the interim winning game pattern;

evaluating the one or more custom bingo cards against predetermined patterns for matching patterns to determine winning player wager selections; and transmitting, to the at least one electronic player interface, at least one message comprising the one or more custom bingo cards and the winning player wager selections.

16. The method of operating the gaming server of claim 15, wherein different player wager selections of the one or more player wager selections are used to create different custom bingo cards.

17. The method of operating the gaming server of claim 15, wherein creating the one or more custom bingo cards further comprises adding the one or more player selected game patterns to predefined spots on the one or more custom bingo cards and filling in any unfilled spots on the one or more custom bingo cards with randomly generated numbers.

18. The method of operating the gaming server of claim 15, wherein evaluating the one or more custom bingo cards for matching patterns further comprises: evaluating the one or more custom bingo cards against predetermined patterns that are determined based on classifications of individual player wager selections.

19. The method of operating the gaming server of claim 15, wherein the interim winning game pattern is generated by a software based random number generator.

20. The method of operating the gaming server of claim 19, wherein the one or more player selected game patterns are for a bingo game that is mapped to a technological aid formed as a big wheel game player interface.

* * * * *